United States Patent
Hall

(10) Patent No.: US 10,511,393 B2
(45) Date of Patent: *Dec. 17, 2019

(54) GEOCAST-BASED FILE TRANSFER

(71) Applicant: AT&T Intellectual Property I, L.P., Atlanta, GA (US)

(72) Inventor: Robert J. Hall, Berkeley Heights, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/601,691

(22) Filed: May 22, 2017

(65) Prior Publication Data

US 2017/0257178 A1 Sep. 7, 2017

Related U.S. Application Data

(63) Continuation of application No. 13/712,353, filed on Dec. 12, 2012, now Pat. No. 9,660,745.

(51) Int. Cl.
*H04H 20/71* (2008.01)
*H04H 60/78* (2008.01)
(Continued)

(52) U.S. Cl.
CPC ............ *H04H 20/71* (2013.01); *H04H 60/78* (2013.01); *H04L 12/1845* (2013.01); *H04W 76/10* (2018.02); *H04L 29/06* (2013.01)

(58) Field of Classification Search
None
See application file for complete search history.

(56) References Cited

U.S. PATENT DOCUMENTS

| 3,833,221 A | 9/1974 | Van |
| 5,483,667 A | 1/1996 | Faruque |

(Continued)

FOREIGN PATENT DOCUMENTS

| WO | WO 2002/054671 A2 | 7/2002 |
| WO | WO 2007/016641 A2 | 2/2007 |

OTHER PUBLICATIONS

U.S. Appl. No. 12/793,460, filed Jun. 3, 2010, Hall.
(Continued)

*Primary Examiner* — Alpus Hsu
*Assistant Examiner* — Camquyen Thai
(74) *Attorney, Agent, or Firm* — BakerHostetler

(57) ABSTRACT

Geocast-based file transfer may be implemented via use of a Geocast File Transfer (GFT) protocol. A sending device may parse a file into multiple chunks. Respective multiple geocast packets comprising the chunks may be geocast. The sending device may geocast all packets sequentially. Upon geocasting all packets, the sending device may wait a predetermined amount of time. During the period of time, any receiving device that did not receive a chunk of the file may geocast a request for the missing chunk. Receiving devices also may wait various respective amounts of time before geocasting requests. Other receiving devices that may have missed a chunk may hear that the chunk it missed is being requested. And that device need not make a request for the chunk. Rather, that device may wait for the sending device to retransmit a geocast packet that contains the missing chunk.

18 Claims, 24 Drawing Sheets

(51) Int. Cl.
*H04L 12/18* (2006.01)
*H04W 76/10* (2018.01)
*H04L 29/06* (2006.01)

(56) References Cited

U.S. PATENT DOCUMENTS

| | | | |
|---|---|---|---|
| 5,583,866 A | 12/1996 | Vook et al. | |
| 5,686,901 A | 11/1997 | Chen | |
| 5,898,730 A | 4/1999 | Hensley et al. | |
| 5,930,716 A | 7/1999 | Sonetaka | |
| 6,006,328 A | 12/1999 | Drake | |
| 6,015,344 A | 1/2000 | Kelly et al. | |
| 6,052,594 A | 4/2000 | Chuang et al. | |
| 6,069,885 A | 5/2000 | Fong et al. | |
| 6,119,976 A | 9/2000 | Rogers | |
| 6,195,751 B1 | 2/2001 | Caronni et al. | |
| 6,304,556 B1 | 10/2001 | Haas | |
| 6,360,107 B1 | 3/2002 | Lin et al. | |
| 6,428,470 B1 | 8/2002 | Thompson | |
| 6,516,199 B1 | 2/2003 | Soderkvist et al. | |
| 6,628,620 B1 | 9/2003 | Cain | |
| 6,781,971 B1 | 8/2004 | Davis et al. | |
| 6,807,165 B2 | 10/2004 | Belcea | |
| 6,816,460 B1 | 11/2004 | Ahmed et al. | |
| 6,842,482 B1 | 1/2005 | Hiramatsu | |
| 6,870,846 B2 | 3/2005 | Cain | |
| 6,879,574 B2 | 4/2005 | Naghian et al. | |
| 6,909,706 B2 | 6/2005 | Wilmer | |
| 6,937,602 B2 | 8/2005 | Whitehill et al. | |
| 6,940,832 B2 | 9/2005 | Saadawi et al. | |
| 6,954,435 B2 | 10/2005 | Billhartz et al. | |
| 6,958,986 B2 | 10/2005 | Cain | |
| 6,987,777 B1 | 1/2006 | Cain et al. | |
| 7,027,822 B1 | 4/2006 | Hwang et al. | |
| 7,152,110 B2 | 12/2006 | Pierce | |
| 7,179,166 B1 | 2/2007 | Abbott | |
| 7,197,326 B2 | 3/2007 | Acampora | |
| 7,295,521 B2 | 11/2007 | Choi et al. | |
| 7,307,978 B2 | 12/2007 | Carlson | |
| 7,435,179 B1 | 10/2008 | Ford | |
| 7,525,933 B1 | 4/2009 | Hall | |
| 7,540,028 B2 | 5/2009 | Ahmed et al. | |
| 7,573,858 B2 | 8/2009 | Roh et al. | |
| 7,613,467 B2 | 11/2009 | Fleischman | |
| 7,669,052 B2 | 2/2010 | Asano et al. | |
| 7,684,790 B2 | 3/2010 | Cartmell | |
| 7,808,960 B1 | 10/2010 | Chan et al. | |
| 7,813,326 B1 | 10/2010 | Kelm et al. | |
| 7,864,168 B2 | 1/2011 | French | |
| 7,895,273 B1 | 2/2011 | Haldar | |
| 7,917,169 B1 | 3/2011 | Hall | |
| 7,957,390 B2 | 6/2011 | Furlong et al. | |
| 7,969,914 B1 | 6/2011 | Gerber | |
| 7,970,749 B2 | 6/2011 | Uhlir et al. | |
| 8,001,189 B2 | 8/2011 | Nielsen et al. | |
| 8,073,327 B2 | 12/2011 | Mayer | |
| 8,074,275 B2 | 12/2011 | Ramaiah et al. | |
| 8,085,813 B2 | 12/2011 | Melick et al. | |
| 8,128,405 B2 | 3/2012 | Preston et al. | |
| 8,149,801 B2 | 4/2012 | Hall | |
| 8,149,846 B2 | 4/2012 | Mutnuru et al. | |
| 8,218,463 B2 | 7/2012 | Hall | |
| 8,248,367 B1 | 8/2012 | Barney et al. | |
| 8,289,186 B2 | 10/2012 | Osafune | |
| 8,332,544 B1 | 12/2012 | Ralls et al. | |
| 8,341,271 B2 | 12/2012 | Cho et al. | |
| 8,355,410 B2 | 1/2013 | Hall | |
| 8,359,643 B2 | 1/2013 | Low et al. | |
| 8,376,857 B1 | 2/2013 | Shuman et al. | |
| 8,410,956 B2 | 4/2013 | Bai et al. | |
| 8,483,616 B1 | 7/2013 | Hall | |
| 8,483,652 B2 | 7/2013 | Hall | |
| 8,599,848 B2 | 12/2013 | Janneteau et al. | |
| 8,702,506 B2 | 4/2014 | Hall | |
| 8,744,419 B2 | 6/2014 | Hall et al. | |
| 8,924,997 B2 | 12/2014 | Chow et al. | |
| 8,965,670 B2 | 2/2015 | Peterson et al. | |
| 9,036,509 B1 | 5/2015 | Addepalli et al. | |
| 9,071,451 B2 | 6/2015 | Hall | |
| 9,161,158 B2 | 10/2015 | Hall | |
| 9,264,863 B2 | 2/2016 | Hall et al. | |
| 9,319,842 B2 | 4/2016 | Hall | |
| 9,652,461 B2 | 5/2017 | Link, II | |
| 2001/0014094 A1 | 8/2001 | Epley | |
| 2002/0067730 A1 | 6/2002 | Hinderks et al. | |
| 2002/0085582 A1 | 7/2002 | Kim | |
| 2002/0113872 A1 | 8/2002 | Kinjo | |
| 2002/0141454 A1 | 10/2002 | Muniere | |
| 2002/0155846 A1 | 10/2002 | Shiraga | |
| 2002/0163912 A1 | 11/2002 | Carlson | |
| 2002/0167960 A1 | 11/2002 | Garcia-Luna-Aceves | |
| 2002/0169971 A1 | 11/2002 | Asano et al. | |
| 2002/0172186 A1 | 11/2002 | Larsson | |
| 2002/0176399 A1 | 11/2002 | Wilmer | |
| 2003/0012167 A1 | 1/2003 | Benveniste | |
| 2003/0053475 A1* | 3/2003 | Veeraraghavan | H04L 1/22 370/431 |
| 2003/0074413 A1 | 4/2003 | Nielsen et al. | |
| 2003/0087645 A1 | 5/2003 | Kim et al. | |
| 2003/0103521 A1 | 6/2003 | Raphaeli et al. | |
| 2003/0105956 A1 | 6/2003 | Ishiguro et al. | |
| 2003/0137993 A1 | 7/2003 | Odman | |
| 2003/0140149 A1 | 7/2003 | Marejka et al. | |
| 2003/0145095 A1 | 7/2003 | Liu et al. | |
| 2003/0153373 A1 | 8/2003 | Squibbs | |
| 2003/0174690 A1 | 9/2003 | Benveniste | |
| 2003/0187570 A1 | 10/2003 | Impson et al. | |
| 2003/0193394 A1 | 10/2003 | Lamb | |
| 2003/0210710 A1 | 11/2003 | Odman | |
| 2003/0235158 A1 | 12/2003 | Lee et al. | |
| 2004/0013062 A1 | 1/2004 | Hino et al. | |
| 2004/0032847 A1 | 2/2004 | Cain | |
| 2004/0083385 A1 | 4/2004 | Ahmed et al. | |
| 2004/0100936 A1 | 5/2004 | Liu et al. | |
| 2004/0121786 A1 | 6/2004 | Radcliffe et al. | |
| 2004/0121792 A1 | 6/2004 | Allen et al. | |
| 2004/0137907 A1 | 7/2004 | Kim | |
| 2004/0151144 A1 | 8/2004 | Benveniste | |
| 2004/0156351 A1 | 8/2004 | Kim | |
| 2004/0184481 A1 | 9/2004 | Lee | |
| 2004/0185881 A1 | 9/2004 | Lee et al. | |
| 2004/0213270 A1 | 10/2004 | Su et al. | |
| 2004/0214571 A1 | 10/2004 | Hong | |
| 2004/0259563 A1 | 12/2004 | Morton et al. | |
| 2004/0264461 A1 | 12/2004 | Janneteau et al. | |
| 2005/0036448 A1 | 2/2005 | Leeuwen | |
| 2005/0039040 A1 | 2/2005 | Ransom et al. | |
| 2005/0047386 A1 | 3/2005 | Yi | |
| 2005/0058151 A1 | 3/2005 | Yeh | |
| 2005/0068934 A1 | 3/2005 | Sakoda | |
| 2005/0086350 A1 | 4/2005 | Mai | |
| 2005/0096031 A1 | 5/2005 | Sugaya et al. | |
| 2005/0096065 A1 | 5/2005 | Fleischman | |
| 2005/0129051 A1 | 6/2005 | Zhu et al. | |
| 2005/0135318 A1 | 6/2005 | Walton et al. | |
| 2005/0141451 A1 | 6/2005 | Yoon et al. | |
| 2005/0152318 A1 | 7/2005 | Elbatt et al. | |
| 2005/0152378 A1 | 7/2005 | Bango et al. | |
| 2005/0208949 A1 | 9/2005 | Chiueh | |
| 2005/0243788 A1 | 11/2005 | Janczak | |
| 2005/0254453 A1 | 11/2005 | Barneah | |
| 2005/0259597 A1 | 11/2005 | Benedetto et al. | |
| 2005/0271057 A1 | 12/2005 | Kim et al. | |
| 2006/0013154 A1 | 1/2006 | Choi et al. | |
| 2006/0023677 A1 | 2/2006 | Labrador et al. | |
| 2006/0084444 A1 | 4/2006 | Kossi et al. | |
| 2006/0126535 A1 | 6/2006 | Sherman | |
| 2006/0128349 A1 | 6/2006 | Yoon | |
| 2006/0148516 A1 | 7/2006 | Reddy et al. | |
| 2006/0153157 A1 | 7/2006 | Roh et al. | |
| 2006/0165015 A1 | 7/2006 | Melick et al. | |
| 2006/0221963 A1* | 10/2006 | Takayanagi | H04L 1/1867 370/390 |
| 2006/0227787 A1 | 10/2006 | Furlong et al. | |

(56) References Cited

U.S. PATENT DOCUMENTS

| | | |
|---|---|---|
| 2006/0236153 A1 | 10/2006 | Aaltonen |
| 2007/0008925 A1 | 1/2007 | Dravida et al. |
| 2007/0019591 A1 | 1/2007 | Chou et al. |
| 2007/0019594 A1 | 1/2007 | Perumal et al. |
| 2007/0104096 A1* | 5/2007 | Ribera ............... H04L 12/1881 370/229 |
| 2007/0110092 A1 | 5/2007 | Kangude et al. |
| 2007/0124395 A1 | 5/2007 | Edge |
| 2007/0180533 A1 | 8/2007 | Ramaiah et al. |
| 2007/0198731 A1 | 8/2007 | Li et al. |
| 2007/0217346 A1 | 9/2007 | Zheng |
| 2007/0226765 A1 | 9/2007 | Bahnck et al. |
| 2007/0259716 A1 | 11/2007 | Mattice et al. |
| 2007/0259717 A1 | 11/2007 | Mattice et al. |
| 2007/0263571 A1 | 11/2007 | Hermann et al. |
| 2007/0265088 A1 | 11/2007 | Nakada et al. |
| 2007/0265089 A1 | 11/2007 | Robarts et al. |
| 2007/0266396 A1 | 11/2007 | Estermann |
| 2007/0283001 A1 | 12/2007 | Spiess et al. |
| 2007/0287437 A1 | 12/2007 | Cartmell |
| 2008/0002574 A1 | 1/2008 | Mosko et al. |
| 2008/0015024 A1 | 1/2008 | Mullen |
| 2008/0039113 A1 | 2/2008 | Liu et al. |
| 2008/0058099 A1 | 3/2008 | Schwartz et al. |
| 2008/0076569 A1 | 3/2008 | Tabata |
| 2008/0080401 A1 | 4/2008 | Ribiere et al. |
| 2008/0095134 A1 | 4/2008 | Chen et al. |
| 2008/0095163 A1 | 4/2008 | Chen et al. |
| 2008/0137624 A1 | 6/2008 | Silverstrim |
| 2008/0144493 A1 | 6/2008 | Yeh |
| 2008/0145050 A1 | 6/2008 | Mayer et al. |
| 2008/0147854 A1 | 6/2008 | Van Datta et al. |
| 2008/0159236 A1 | 7/2008 | Ch'ng et al. |
| 2008/0163355 A1 | 7/2008 | Chu |
| 2008/0186206 A1 | 8/2008 | Reumerman |
| 2008/0192737 A1 | 8/2008 | Miyazaki |
| 2008/0262928 A1 | 10/2008 | Michaelis |
| 2008/0310439 A1 | 12/2008 | Gale |
| 2008/0317017 A1* | 12/2008 | Wiemann ............... H04L 1/0002 370/389 |
| 2009/0005140 A1 | 1/2009 | Rose et al. |
| 2009/0017913 A1 | 1/2009 | Bell et al. |
| 2009/0030605 A1 | 1/2009 | Breed |
| 2009/0041039 A1 | 2/2009 | Bear et al. |
| 2009/0045977 A1 | 2/2009 | Bai et al. |
| 2009/0046628 A1 | 2/2009 | Hall |
| 2009/0073912 A1 | 3/2009 | Bauchot et al. |
| 2009/0119696 A1 | 5/2009 | Chow et al. |
| 2009/0122753 A1* | 5/2009 | Hughes ............... H04L 45/122 370/329 |
| 2009/0138353 A1 | 5/2009 | Mendelson |
| 2009/0175223 A1 | 7/2009 | Hall |
| 2009/0195401 A1 | 8/2009 | Maroney et al. |
| 2009/0201860 A1 | 8/2009 | Sherman et al. |
| 2009/0207783 A1 | 8/2009 | Choi et al. |
| 2009/0245518 A1 | 10/2009 | Bae et al. |
| 2009/0248420 A1 | 10/2009 | Basir et al. |
| 2009/0274093 A1 | 11/2009 | Senouci et al. |
| 2009/0292926 A1 | 11/2009 | Daskalopoulos et al. |
| 2009/0298461 A1 | 12/2009 | O'Reilly |
| 2009/0310516 A1 | 12/2009 | Goel et al. |
| 2009/0323579 A1 | 12/2009 | Bai et al. |
| 2009/0325603 A1 | 12/2009 | Van Os et al. |
| 2010/0008259 A1 | 1/2010 | Yoon et al. |
| 2010/0029245 A1 | 2/2010 | Wood et al. |
| 2010/0042601 A1 | 2/2010 | Kelley et al. |
| 2010/0060480 A1 | 3/2010 | Bai et al. |
| 2010/0064307 A1 | 3/2010 | Malhotra et al. |
| 2010/0067451 A1 | 3/2010 | Hall |
| 2010/0069109 A1 | 3/2010 | Hall |
| 2010/0074234 A1 | 3/2010 | Banks et al. |
| 2010/0082513 A1 | 4/2010 | Liu |
| 2010/0115605 A1 | 5/2010 | Beattie et al. |
| 2010/0125865 A1 | 5/2010 | Ospalik et al. |
| 2010/0125867 A1 | 5/2010 | Sofos et al. |
| 2010/0128653 A1* | 5/2010 | Tateson ............... H04L 1/188 370/315 |
| 2010/0150129 A1 | 6/2010 | Jin et al. |
| 2010/0162149 A1 | 6/2010 | Sheleheda et al. |
| 2010/0169009 A1 | 7/2010 | Breed et al. |
| 2010/0177642 A1* | 7/2010 | Sebastian ............ H04L 12/1859 370/248 |
| 2010/0202346 A1* | 8/2010 | Sitzes ................... H04W 84/18 370/328 |
| 2010/0214987 A1 | 8/2010 | Mori |
| 2010/0215040 A1 | 8/2010 | Kappler et al. |
| 2010/0226342 A1 | 9/2010 | Colling et al. |
| 2010/0235633 A1 | 9/2010 | Asano et al. |
| 2010/0245124 A1 | 9/2010 | Bai et al. |
| 2010/0248618 A1 | 9/2010 | Bai et al. |
| 2010/0248843 A1 | 9/2010 | Karsten |
| 2010/0250106 A1 | 9/2010 | Bai et al. |
| 2010/0250346 A1 | 9/2010 | Bai et al. |
| 2010/0251282 A1 | 9/2010 | Howcroft |
| 2010/0253547 A1 | 10/2010 | Tenetylo |
| 2010/0279776 A1 | 11/2010 | Hall |
| 2010/0287011 A1 | 11/2010 | Muchkaev |
| 2010/0304759 A1 | 12/2010 | Leppanen et al. |
| 2010/0329463 A1 | 12/2010 | Ratliff et al. |
| 2011/0002243 A1 | 1/2011 | Sherman et al. |
| 2011/0016225 A1 | 1/2011 | Park et al. |
| 2011/0058675 A1 | 3/2011 | Brueck et al. |
| 2011/0063116 A1 | 3/2011 | Lepley |
| 2011/0081973 A1 | 4/2011 | Hall |
| 2011/0102459 A1 | 5/2011 | Hall |
| 2011/0103302 A1 | 5/2011 | Hall |
| 2011/0105151 A1 | 5/2011 | Hall |
| 2011/0109482 A1 | 5/2011 | Haran |
| 2011/0158295 A1 | 6/2011 | Shiizaki |
| 2011/0164546 A1 | 7/2011 | Mishra et al. |
| 2011/0177829 A1 | 7/2011 | Platt et al. |
| 2011/0179330 A1 | 7/2011 | Matsumoto |
| 2011/0191425 A1 | 8/2011 | Brodeur et al. |
| 2011/0201369 A1 | 8/2011 | Kim et al. |
| 2011/0230202 A1 | 9/2011 | Wood et al. |
| 2011/0244887 A1 | 10/2011 | Dupray et al. |
| 2011/0299685 A1 | 12/2011 | Hall |
| 2012/0011225 A1* | 1/2012 | Keum ................... H04H 20/40 709/219 |
| 2012/0016940 A1 | 1/2012 | Hall |
| 2012/0023550 A1 | 1/2012 | Xu et al. |
| 2012/0030292 A1 | 2/2012 | John et al. |
| 2012/0039231 A1* | 2/2012 | Suri ..................... H04L 67/104 370/312 |
| 2012/0058744 A1 | 3/2012 | Felt et al. |
| 2012/0058814 A1 | 3/2012 | Lutnick et al. |
| 2012/0072845 A1 | 3/2012 | John et al. |
| 2012/0079080 A1 | 3/2012 | Pishevar |
| 2012/0084364 A1 | 4/2012 | Sivavakeesar |
| 2012/0090000 A1 | 4/2012 | Cohen et al. |
| 2012/0094770 A1 | 4/2012 | Hall |
| 2012/0108326 A1 | 5/2012 | Hall |
| 2012/0113986 A1 | 5/2012 | Shaffer et al. |
| 2012/0128010 A1 | 5/2012 | Huang et al. |
| 2012/0131611 A1 | 5/2012 | Yeap et al. |
| 2012/0134317 A1 | 5/2012 | Weitkemper et al. |
| 2012/0157210 A1 | 6/2012 | Hall |
| 2012/0236718 A1* | 9/2012 | Noureddin ............ H04L 47/12 370/235 |
| 2012/0251076 A1 | 10/2012 | Stewart et al. |
| 2012/0251077 A1 | 10/2012 | Stewart et al. |
| 2012/0329538 A1 | 12/2012 | Hall |
| 2013/0012231 A1 | 1/2013 | Hall |
| 2013/0090129 A1 | 4/2013 | Turner et al. |
| 2013/0099941 A1 | 4/2013 | Jana et al. |
| 2013/0099976 A1 | 4/2013 | Cornwall et al. |
| 2013/0232558 A1 | 9/2013 | Brown et al. |
| 2013/0242956 A1 | 9/2013 | Hall |
| 2013/0244564 A1 | 9/2013 | Hall |
| 2013/0304847 A1* | 11/2013 | Ewanchuk ............ H04L 67/06 709/217 |
| 2014/0082369 A1 | 3/2014 | Waclawsky et al. |
| 2014/0098686 A1 | 4/2014 | Panta et al. |

(56) References Cited

U.S. PATENT DOCUMENTS

2014/0100027 A1 4/2014 Harris et al.
2014/0161006 A1 6/2014 Hall
2014/0335952 A1 11/2014 Hall

OTHER PUBLICATIONS

U.S. Appl. No. 12/837,168, filed Jul. 15, 2010, Hall.
U.S. Appl. No. 12/914,886, filed Oct. 28, 2010, Hall.
U.S. Appl. No. 12/969,386, filed Dec. 15, 2010, Hall.
U.S. Appl. No. 13/169,829, filed Jun. 27, 2011, Hall.
U.S. Appl. No. 13/169,892, filed Jun. 27, 2011, Hall.
U.S. Appl. No. 13/712,353, filed Dec. 12, 2012, Hall.
Aggarwal, Sudhir et al., "Accuracy in dead reckoning based distributed multi-player games", SIGCOMM '04 Workshops, (Proceedings of 3rd ACM SIGCOMM Workshop on Network and System Support for Games), Aug. 30-Sep. 3, 2004, Portland, Oregon, pp. 161-165.
Bjerver, Martin, "Player Behaviour in Pervasive Games—using the City as a Game Board in Botfighters", Master of Science Thesis, KTH Computer Science and Communication, Stockholm, Sweden, 2006.
Bzflag(6):tank battle game—linux man page, Google date Feb. 1, 2001, downloaded from http://linux.die.net/man/6/bzflag.
De Souza e Silva, Adriana, "Alien revolt (2005-2007): A case study of the first location-based mobile game in Brazil", IEEE Technology and Society Magazine, Spring 2008, pp. 18-28.
Dialogic, "Adding location based services to existing architectures", Application Note: Location-Based Services, 9862-02, Oct. 2007, 14 pages, downloaded from http://www.dialogic.com/-/media/products/docs/signaling-and-ss7-component-s/9862.sub.--Add.sub.--Locationbased.sub.--Servs.sub.--an.pdf.
Gallagher, Sean, "Army prepares test of new wireless war game gear", Defense Systems, Jul. 7, 2008, downloaded from http://defensesystems.com/articles/2008/07/army-prepares-test-of-new-wire- less-war-game-gear.aspx.
Hales, Jacek, "Ghost Recon: Advanced Warfighter Game Guide, [Mission 01] Contact!--Objective: Locate Ramirez with the Drone", 2007, downloaded from http://guides.gamepressure.com/ghostreconadvancedwarfighter/guide.as- p?ID=986.
Hohfeld, Alexander, "In and out of reality: Janus-faced location awareness in ubiquitous games", Journal of Software, 2(6), Dec. 2007, 86-92.
Kim, Seong-Whan et al., "Kalman filter based dead reckoning algorithm for minimizing network traffic between mobile nodes in wireless GRID", Embedded and Ubiquitous Computing, Lecture Notes in Computer Science, 4096, 2006, 162-170.
Lindo, Wayne A. et al., "Network modeling and simulation in the OneTESS program", Fall Simulation Interoperability Workshop 2006, Orlando, Florida, USA, Sep. 10-15, 2006, 155ff.
MyCheats web page, "Ghost Recon: Advanced Warfighter Superguide, Reach Ramirez", (Jul. 19, 2006), downloaded from http://mycheats.1up.com/view/section/3139558/18404/ghost.sub.--recon.sub.- --advanced.sub.--warfighter/pc.
Santos, Nuno et al., "Vector-field consistency for ad-hoc gaming", Middleware 2007, LNCS 4834, 2007, pp. 80-100.
Sotamaa, Olli, "All the world's a Botfighter Stage: Notes on location-based multi-user gaming", Proceedings of Computer Games and Digital Cultures Conference, Tampere University Press, 2002, pp. 35-44.
U.S. Appl. No. 13/875,735, filed May 2, 2013, Hall.
U.S. Appl. No. 13/890,423, filed May 9, 2013, Hall.
Nicklas et al., "On building location aware applications using an open platform based on the NEXUS Augmented World Model," Software and Systems Modeling, Dec. 2004, 3(4), 303-313.
Nintendo, The computer game "Mario Kart OS", released in North America on Nov. 14, 2005, published by Nintendo, as evidenced by the game FAQ by Alex, downloaded from http://db.gamefaqs.com/portable/ds/file/mario.sub.--kart.sub.--ds.sub.--h- .txt, with a game FAQ reported upload date of Jul. 15, 2007, p. 11.

Winkler, Additional date evidence for the Ars Electronica organization archive document http://archive.aec.at/submission/2004/U19/1043/, retrieved from http://web.archive.org/web/20050508084628/ http://www.aec.at/en/archives/p- rix.sub.--archive/prixproject.asp?iProjectID=12899, 2005, 1 page.
Winkler, The computer game "GPS::Tron", as evidenced by the Ars Electronica organization archive document http://archive.aec.at/submission/2004/U19/1043/, where the document has an earliest archive.org verified publication date May 4, 2005, pp. 1-2.
U.S. Appl. No. 13/327,472, filed Dec. 15, 2011, Hall.
U.S. Appl. No. 13/333,084, filed Dec. 21, 2011, Hall.
U.S. Appl. No. 11/264,834, filed Nov. 1, 2005, Hall.
U.S. Appl. No. 13/277,895, filed Oct. 20, 2011, Hall.
U.S. Appl. No. 13/563,429, filed Jul. 31, 2012, Hall.
U.S. Appl. No. 13/683,025, filed Nov. 21, 2012, Hall.
Corbett, et al. "A Partitioned Power and Location Aware MAC Protocol for Mobile Ad Hoc Networks," Technical Report No. 553, University of Sydney, School of Information Technologies, Jul. 2004, 7 pages.
Balasubramaniam, et al. "Interactive WiFi Connectivity for Moving Vehicles," Proceedings of SIGCOMM, Aug. 17-22, 2008, 12 pages.
Das, et al., "SPAWN: A Swarming Protocol for Vehicular Ad-Hoc Wireless Networks," Proceedings of 1.sup.81 ACM Vanet, Oct. 2004, 2 pages.
German Aerospace Center, Simulation of Urban Mobility, 2010, http://sumo.sourceforge.net, 1 page.
Gupta, et al., "The Capacity of Wireless Networks," IEEE Transactions on Information Theory, 46(2), Mar. 2000, 17 pages.
Hadaller, et al., "Vehicular Opportunistic Communication Under the Microscope," Proceedings of MobiSys, Jun. 11-14, 2007, 206-219.
Heissenbuttel, et al., "BLR: Beacon-Less Routing Algorithm for Mobile Ad-Hoc Networks," Elsevier's Computer Communications Journal, 27, 2003, 15 pages.
Hall, et al., "A Tiered Geocast Protocol for Long Range Mobile Ad Hoc Networking," Proceedings of the 2006 IEEE Military Communications Conf., 2006, 8 pages.
Hall, "Cheating Attacks and Resistance Techniques in Geogame Design," Proc. 2010 ACM FuturePiay Symposium, 2010, 82-89.
Hall, "An Improved Geocast for Mobile Ad Hoc Networking," IEEE Transactions on Mobile Computing, 2010, 1-14.
Hull, et al., "CarTel: A Distributed Mobile Sensor Computing System," Proceedings of ACM SenSys, Nov. 2006, 14 pages.
Eriksson, et al., "Cabernet: Vehicular Content Delivery Using WiFi," Proceedings of Mobicom, Sep. 2008, 12 pages.
Karp, et al, "GPSR: Greedy Perimeter Stateless Routing for Wireless Networks," Proceedings of Mobicom, 2000, ACM 2000, 12 pages.
Kuhn, et al., "Geometric Ad-Hoc Routing: of Theory and Practice," Proc. 2003 Symposium on Principles of Distributed Computing, ACM 2003, 10 pages.
Lee, et al., "CarTarrent: A Bit-Torrent System for Vehicular Ad-Hoc Networks," Mobile Networking for Vehicular Environments, Sep. 2007, 6 pages.
Lee, et al., "Efficient Geographic Routing in Multihop Wireless Networks," Proc. MobiHoc 2005, ACM, 2005, 12 pages.
Ni, et al., "The Broadcast Storm Problem in a Mobile Ad Hoc Network," Proceedings of the 5th Annual ACM/IEEE International Conference on Mobile Computing and Networking, ACM, 1999, 151-162.
Niculescu, et al., "Trajectory Based Forwarding and Its Applications," Proc. Mobicom 2003, ACM, 2003, 13 pages.
Ns-2, "The Network Simulator," 2010, http:i/isi.eduinsnam/ns, 2 pages.
Panta, "Geo V2V: Vehicular Communications Using a Scalable Ad Hoc Geocast Protocol," AT&T Labs Research, 14 pages.
Yassein, et al., "Performance Analysis of Adjusted Probabilistic Broadcasting in Mobile Ad Hoc Networks," Proc. 11th Int. Conf. on Parallel and Distributed Systems Workshops, 2005, 27 pages.
Zorzi, et al., "Geographic Random Forwarding (GeRaF) for Ad Hoc and Sensor Networks: Multihop Peformance," IEEE Transactions on Mobile Computing, Dec. 2003, 11 pages.

(56) References Cited

OTHER PUBLICATIONS

Ko, et al., "Flooding-Based Geocasting Protocols for Mobile Ad Hoc Networks," Mobile Networks and Applications, Dec. 2002, 7, 471-480.
Social + Gaming—SWiK:, 2009, http://swik.net/social+ gaming.
What Wii games can I play over the internet with my family?How?, http://askville.amazon.com/Wii-games-play-internetFamily/AnswerViewer.do?requestId=6796582(2007).
Schutzberg, "Phone-based GPS-based Games: Missing Pieces"; http://www.directionsmag.com/articlephp?article.sub.--id=939 (Aug. 17, 2005).
Hall, "RTEQ: Modeling and Validating Infinite-State Hard-Real-Time Systems", AT&T Labs Research, ASE 2007, Nov. 2007, 4 pages.
Illyas, "Body Personal, and Local Ad Hoc Wireless Networks", Chapter 1, CRC Press, 2003, 22 pages.
Ko et al., "Geocasting in Mobile Ad Hoc Networks: Location-based Multicast Algorithms", Technical Report TR-98-018 Texas A&M University, Sep. 1998.
Liao et al., "GRID: A Fully Location-Aware Routing Protocol for Mobile Ad Hoc Networks", Telecommunication Systems, 2001, 18, pp. 1-26.
Shih et al., A Distributed Slots Reservation Protocol for QoS Routing on TDMA-based Mobile Ad Hoc Networks, 2004, (ICON 2004), Proceedings, 12.sup.1 IEEE International Conference, Nov. 2004, 2, 660-664.
Shih et al., "CAPC: A Collision Avoidance Power Control MAC Protocol for Wireless Ad Hoc Networks", IEEE Communications Letters, Sep. 2005, 9(9), 859-861.
Tseng et al., "Fully Power-Aware and Location-Aware Protocols for Wireless Multi-hop Ad Hoc Networks", Proc. of IEEE Inti. Conference on Computer Communications and Networks (ICCCn), 2002, 6 pages.
LBS Globe—Your definitive source for location-based services information,"Location-Enabled Mobile Gaming"; http://www.nn4d.com/site/global/market/affiliatesites/lbsglobe/bsapplications/mobilegamingsp (2007).
"Sony bigwig hints at GPS-enabled PSP games/Technology Space"; Dec. 22, 2008, http://www.vespacious.com/sony:-bigwig-hints-at-gps-enabled-psp-gam- es.html.
Hall et al., "A Two-Level Quality of Service Scheme for Collision based on Mobile Ad Hoc Networks", IEEE, 1-4244-1513-06/07,2007, 8 pages.

"Boost Mobile Introduces First Location-Based, GPS Games in US" http.www.Physorg.com/news5824.html (Aug. 16, 2005).
Maihofer, "A Survey of Geocast Routing Protocols," IEEE Communications Surveys, Jun. 2004, 32-42.
Manvi, et al., "Performance Analysis of AODV, DSR, and Swarm Intelligence Routing Protocols in Vehicular Ad Hoc Network Environment," Proceedings of IEEE Future Computer and Communications, Apr. 2009, 21-25.
Schwingenschlogl, "Geocast Enhancements of AODV for Vehicular Networks," ACM SIGMOBILE Mobile Computing and Communications Review, Jun. 2002, 18 pages.
Shevade, et al., "Enabling High-Bandwidth Vehicular Content Distribution," Proceedings of CoNEXT 2010, Nov. 30-Dec. 3, 2010, 12 pages.
Strange New Products: GPS-enabled Cell Phone Games http://www.strangenewproducts.com/2005/08/gps-enabled-cell-phone-games.ht- ml (Aug. 15, 2005.
Various Authors, The Wikipedia page for the "snake" computer game, Nov. 3, 2008 version, Wikipedia.com, downloaded by the USPTO from http://en.wikipedia.org/w/index.php?title=Snake.sub.--(video.sub.--game)&-oldid=249370716 on Oct. 4, 2012.
Zahn, et al., "Feasibility of Content Dissemination Between Devices in Moving Vehicles," Proceedings of CoNEXT 2009, Dec. 1-4, 2009, 11 pages.
Social + Gaming—SWiK: http://swik.net/social+ gaming, 2009.
U.S. Appl. No. 14/279,441, filed May 16, 2014, Hall.
Hall, "Combinatorial Communications Modeling of Real-Time Engagement Adjudication Architectures", 2005 IEEE Military Communications Conference, Oct. 2005, vol. 3, 1488-1494.
Harris, RF-6920 C2CE-CNR Situational Awareness Application Brochure, downloaded from http:/ /rf. harris.com/media/R F-6920 tcm26-9172.pdf, Nov. 2008, 2 pages.
Kaplan, et al., "The Analysis of a Generic Air-to-Air Missile Simulation Model", NASA Technical Memorandum 109057, Jun. 1994, 48 pages.
Trivette, Sensor integration for the One Tactical Engagement Simulation System (One TESS), downloaded from http://vault.swri.org/cms/papers/3793 Presentation.sub.--2005 SensorsGov OneTESS.pdf, 2005, 28 pgs.
International Patent Application No. PCT/US2012/038079: International Search Report and Written opinion dated Oct. 17, 2012, 12 pages.
Seada, et al, "Efficient and robust geocasting protocols for sensor networks", Computer Communications, Elsevier Science Publishers BV, Jan. 10, 2006, 29(2), 151-161.

\* cited by examiner

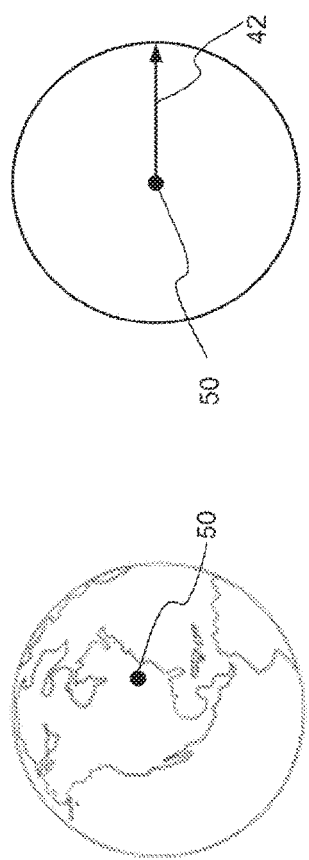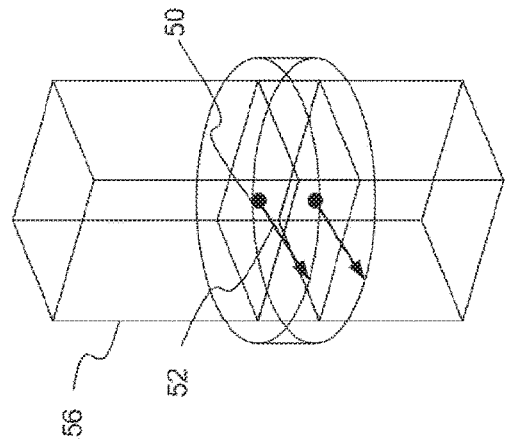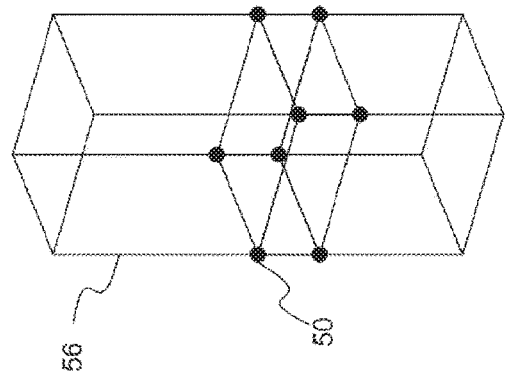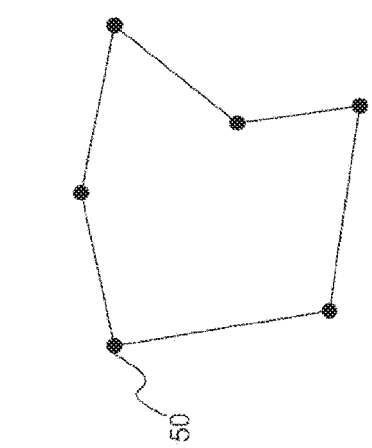
Figure 4A  Figure 4B  Figure 4C  Figure 4D  Figure 4E

GEOCAST-BASED FILE TRANSFER

TECHNICAL FIELD

The technical field generally relates to wireless communications, and more specifically to geographic broadcasting of large files of data.

BACKGROUND

It may be desirable to transfer data files from one sender device to a group of devices in a given geographic area. For example, a military operator may wish to transfer a picture to team members nearby. In scenarios where there is no network infrastructure coverage, this may be problematic. Cloud resources are not available. In addition, it may be highly inefficient to send the same file to many devices in an area by unicasting sequentially the entire file to each recipient. This may result in wasteful use of scarce wireless bandwidth resources and may take a long time.

SUMMARY

The following presents a simplified summary that describes some aspects or embodiments of the subject disclosure. This summary is not an extensive overview of the disclosure. Indeed, additional or alternative embodiments of the subject disclosure may be available beyond those described in the summary.

A scalable geographic multicast (geocast) protocol, also referred to herein as the Geocast File Transfer (GFT) protocol, may be utilized to transfer a file to devices in a geographic area. The file may be segmented and multiple packets comprising segments may be geocast. A unique messaging protocol, (e.g., the GFT protocol) may be utilized to control geocast tries and retries, with mutual cross-suppression of redundant messages and random time backoffs.

For example, when a file of data is too large to fit into a single geocast packet, the file may be transmitted (e.g., geocast) using multiple packets comprising different parts of the data (referred to as chunks). In an example embodiment chunks may be contiguous strings of bytes of data from the file. A sender of the file may first send a geocast packet that notifies recipients of the file's name and size and that file data will follow. In an example embodiment, file data may be included in the first geocast packet. Subsequently, the sender may send one chunk at a time, each chunk in its own geocast packet. Once all chunks are sent the first time, a special packet may be sent to notify recipients that a first phase (e.g., phase 1) is complete and that the recipients may commence sending requests back to the sender for chunks that may not have been received during phase 1. Devices may listen to others devices' requests and avoid sending redundant requests. After a predetermined amount of time, the file sender may respond to requests by repeating chunk geocast packets for the requested chunks. Once any recipient has received all chunks of a file, it may terminate the process.

BRIEF DESCRIPTION OF THE DRAWINGS

Reference is made here to the accompanying drawings, which are not necessarily drawn to scale.

FIG. 4, comprising FIG. 4A, FIG. 4B, FIG. 4C, FIG. 4D, and FIG. 4E depicts example geocast regions or boundaries.

DETAILED DESCRIPTION OF ILLUSTRATIVE EMBODIMENTS

Figure 1:
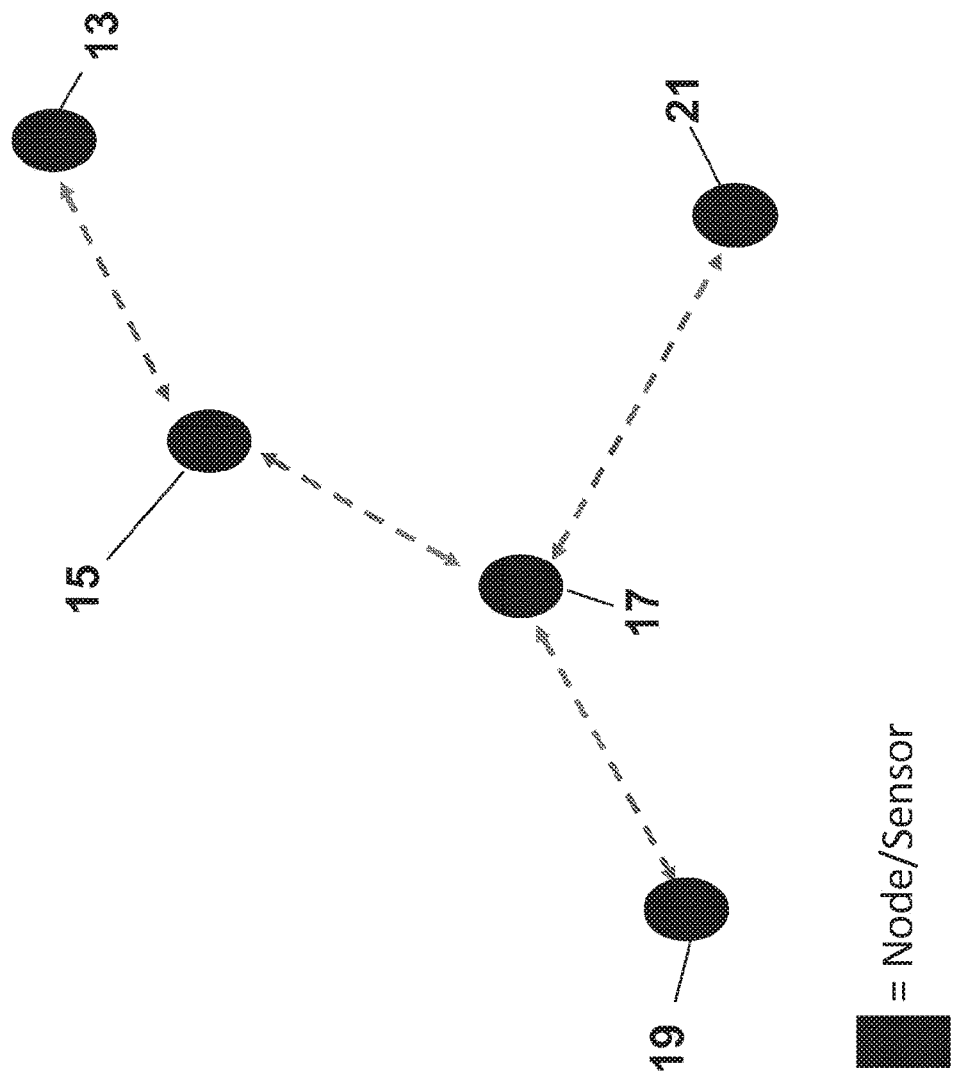
FIG. 1 illustrates an example mobile ad hoc network in which a mobile device configured to implement the GFT protocol may be implemented.

Aspects of the instant disclosure are described more fully herein with reference to the accompanying drawings, in which example embodiments are shown. In the following description, for purposes of explanation, numerous specific details are set forth in order to provide an understanding of the various embodiments. However, the instant disclosure may be embodied in many different forms and should not be construed as limited to the example embodiments set forth herein. Like numbers refer to like elements throughout.

Various embodiments of geocast file transfer, and implementation mechanisms for geocast file transfer are described herein. The described embodiments are merely examples that may be embodied in various and alternative forms, and combinations thereof. As used herein, for example, "exemplary," and similar terms, refer expansively to embodiments that serve as an illustration, specimen, model, or pattern, and should not be construed to mean preferred or advantageous over other aspects or designs, nor is it mean to preclude equivalent exemplary structures and techniques known to those of ordinary skill in the art. The figures are not necessarily to scale and some features may be exaggerated or minimized, such as to show details of particular components. In some instances, well-known components, systems, materials, or methods have not been described in detail in order to avoid obscuring the instant disclosure. Therefore, specific structural and functional details disclosed herein are not to be interpreted as limiting, but rather as a basis for the claims and as a representative basis for teaching one skilled in the art how to employ the teachings instant application in various ways.

While the descriptions include a general context of computer-executable instructions, geocast file transfer also may be implemented in combination with other program modules and/or as a combination of hardware and software. The term "application," or variants thereof, may be used expansively herein to include routines, program modules, programs, components, data structures, algorithms, and the like. Applications can be implemented on various system configurations, including single-processor or multiprocessor systems, minicomputers, mainframe computers, personal computers, hand-held computing devices, microprocessor-based, programmable consumer electronics, combinations thereof, or the like.

In an example embodiment, geocast file transfer may be implemented via a scalable, wireless, geographic multicast ("geocast") protocol. Geocast file transfer may be implemented over an ad hoc network of mobile communications devices (nodes), eliminating the need for traditional mobile communications infrastructure and central servers. Because no network infrastructure is required, geocast file transfer may be implemented in remote areas with little or no network access. The scalable nature of the geocast protocol can enable implementation of geocast file transfer equally well in both remote areas and crowded areas containing members of a field operations team and other users of mobile communications devices. Geocast file transfer also may be implemented using tiered geocasting which may span great distances. For example, geocast file transfer may span separate continents.

Nodes taking part in geocast file transfer may be programmed with a geocast file transfer application, which uses geolocation information obtained from a locating system, such as, for example, a global positioning system (GPS), or the like. The geocast file transfer application of each node may use movement data from an inertial unit, or the like, of the node.

The scalable tiered geocast communication protocol may be programmed into each node taking part in geocast file transfer, and any node that operates to relay communications to or from the nodes taking part in geocast file transfer. The nodes taking part in geocast file transfer may share changed situation conditions, such as node geolocation, between them via geocast data packets transmitted over one or both of a first tier, short-range, network, and a second tier, long-range, network according to transmission heuristics of the tiered geocast protocol.

In an example embodiment, each node taking part in geocast file transfer may be programmed with the scalable tiered geocast communication protocol. One example of a type of scalable protocol is the mobile ad hoc network geocast protocol. Using the tiered geocast protocol, the Geocast File Transfer (GFT) protocol may be occasioned in all types of network scenarios, including those in which relevant areas are densely populated with participating nodes, those in which areas are sparsely populated, and even in areas long-range infrastructure such as cell towers, Wi-Fi hotspot or other internet router are not reachable by the nodes.

Geocast protocols differ from a traditional Internet protocol (IP) such as the uniform datagram protocol (UDP) in that messages are addressed to a destination geocast region instead of an IP address, such as an UDP address. Utilizing the geocast protocol, nodes in a target region do not need to register to a group address, as required of some other protocols. In some example embodiments, each geocast data packet can be assigned, at origination, a globally unique packet serial number. The unique packet serial number can be read by participating devices according to the protocol to, for example, determine whether a particular data packet is being received for a first time or has been received before. The packet serial number and all other packet information may be positioned in a header or body of the data packet.

The geocast file transfer application may be, in some embodiments, configured to store pre-set or previously identified geocast destination, locations, boundary, region, or the like.

Geocast data packets may be transmitted according to heuristics of a tiered geocast protocol, which is described in more detail herein, to a destination geocast region for reception by all devices located in the region that are programmed with the geocast protocol, i.e., participating devices.

Although basic geocasting over only a single network (e.g., long-range network) may enable communications in some situations where traditional networking is impractical or inadequate, it may be that, in some embodiments, one may selectively geocast over one or more of two or more networks (i.e., tiers) versus the flat configuration of a single network. The tiered geocast protocol of the present disclosure improves on single-network geocasting by providing the heuristics, or decision rules, for selectively propagating geocast data packets within a relatively short-range, peer-to-peer network, and bridging packets onto a long-range network for long-distance transport depending on various circumstances. Each participating node and other nodes (e.g., Wi-Fi access point or other router) can have forwarding rules, including geographical parameters, and a look-up table for use in implementing the rules.

In an example embodiment, the geocast system can be configured such that a transmitting node receives a confirmation that a geocast data packet was transmitted successfully. For example, it is contemplated that at least one of the nodes in a geocasting destination region, even if not a node actively participating, could return geocast a confirmation data packet indicating that the packet was received by a node in the region. In one contemplated embodiment, although the protocol is based on a geographical address and not a device-specific address, a device-specific address of a target node participating is included in a geocast and the target node initiates inclusion in a return geocast data packet of a confirmation of receipt message to the originating node.

In addition, in some embodiments, a geocast data packet can include one or more fields, such as in a header or body of the packet, in which information related to a path taken by a packet is recorded. For example, a receiving node (e.g., node or Internet router) receiving a geocast can retrieve data from the geocast header to identify an ordered list of the nodes whose transmissions led to the receiving node receiving it. In this way, path discovery may be integrated into the transmission process. Any node can also use this information to send a source-routed unicast back to any node along the path, which is termed reverse-path forwarding (RPF).

Although a two-tiered communication system, including a first short-range peer-to-peer network and a long-range network, is described herein, the GFT protocol may be implemented in connection with a protocol and communication system using other types of networks as well as or instead of those described herein, and in connection with more than two network tiers.

Propagations over the short-range network may be made between devices programmed with the scalable tiered geocast protocol, whereby adjacent devices are within range of each other, such as radio range (e.g., 100 meters). The nodes and tiered geocast protocol can be configured to transmit geocast data packets over one or more short-range networks, including existing wireless local area networks (WLANs), such an IEEE 802.11 network. As an example, when a first node is about 900 meters from an edge of a geocasting region including a second node, a geocast data packet from the first device could be broadcasted and participating intermediate devices could receive and retransmit the geocast data packet until it reached the geocast region, without need for transmission over an Internet router or other base station. In this example, depending on the location of a retransmitting device, the geocast data packet can be broadcast to the geocast region in one or two hops.

Geocast file transfer may be particularly suited to highly mobile devices without requiring connection to an infrastructure-based communications network. A mobile ad hoc network is an example of such a set of devices. Mobile ad hoc networks can extend the reach of data networking into areas and scenarios in which infrastructure-based networking is impossible or impractical. For example, mobile ad hoc networks can allow first responders to use networked messaging and information applications in a zone where the network infrastructure has been destroyed by a disaster. Mobile ad hoc networks can provide military units operating in battlefield situations lacking infrastructure the same types of benefits as infrastructure-based networks. Mobile ad hoc networks can allow networking among low resource nodes, such as man-worn devices powered by lightweight wearable batteries, by allowing units to relay each other's short-range transmissions, instead of each unit transmitting long range directly to the destination.

To better understand the GFT protocol and applications thereof, a description of mobile ad hoc networks is provided. In is to be understood however, that applications of the GFT protocol are not limited to mobile ad hoc networks. Rather, the GFT protocol is applicable to any appropriate device or group of devices.

A mobile ad hoc network may comprise communications devices (also referred to as nodes) that communicate with each other via geographical broadcasting, referred to as geocasting. Geocasting is described in U.S. Pat. No. 7,525,933, entitled "System And Method For Mobile Ad Hoc Network," filed Nov. 30, 2005, issued Apr. 28, 2009, and is incorporated by reference herein in its entirety. Geocasting can use a protocol in which an IP address is replaced with a geographic address. Thus, each geocast message can comprise an indication of a location of a geographic region of intended reception of the geocast message. Generally, a packet may be sent to every communications device located within a specific geographic region. The packet can contain an indication of the location of the sender, an indication of the geographic region, a payload, or a combination thereof, or the like. The communications devices in the geographic region, and any other communications devices that can communicate with them, are referred to, collectively, as a mobile ad hoc network. No registration need be required to become a member of the mobile ad hoc network. Any communications device in the mobile ad hoc network can send a message to any or every communications device in the mobile ad hoc network. As communications devices move within communications range of any member of the mobile ad hoc network, they can become members of the mobile ad hoc network without requiring registration. The communications devices of the ad hoc network of communications devices may communicate with each other. The ad hoc network of communications devices does not require base station terminals to control communications between the mobile devices. In example embodiments, base stations or routers may be used to relay messages between different mobile ad hoc networks, or to use other network transports such as other traditional internet protocol networks, such as the internet, to bridge messages between mobile ad hoc networks. Each communications device may be capable of receiving and/or transmitting data packets to and/or from other communications devices in the mobile ad hoc network.

In an example embodiment, a communications device can transfer packets to other communications devices according to heuristic decision rules that determine whether a receiving device will re-transmit a received packet. These rules can effectively guide packets to their destinations and control communication traffic within the ad hoc network. The decision rules can achieve this control by using statistics obtained and recorded by a communications device as it receives packets transmitted within reception range within its environment. This distributed packet transfer mechanism cab result in packets "flowing" to and throughout the geocast region specified in each packet. The communications devices in the geocast region can receive and process each distinct packet, typically rendering the content to the user via a user interface of a communications device. Two packets may be distinct if they contain distinct geocast identifiers. However, a re-transmitted copy of a packet generally will contain the same geocast identifier as the original packet.

FIG. 1 illustrates an example mobile ad hoc network in which a mobile device configured to implement geocast-based transfer may be implemented. Communications devices, also referred to herein as devices, mobile devices, or nodes, in the mobile ad hoc network can communicate via RF encoded with geographic information, via Bluetooth technology, via Wi-Fi (e.g., in accordance with the 802.11 standard), or the like, or any combination thereof. For example, as depicted in FIG. 1, communication devices (nodes) 13, 15, 17, 19, and 21 can form a mobile ad hoc network. As shown in FIG. 1, communication device 13 can communicate with communications device 15 directly (e.g., via Bluetooth). Communication device 15 can communicate with communications device 17, and thus can retransmit information received from communications device 13 to communications device 17, and vice versa (retransmit information received from communications device 17 to communications device 13). Communications device 17 can communicate with communications devices 19 and 21, and can relay information from/to communications devices 19 and/or 21 to/from communications devices 13 and/or 15.

Although not depicted in FIG. 1, it is possible, in a mobile ad hoc network, that, for a pair of nodes (A and B for example), node A can receive from node B but node B cannot receive from node A. In an example embodiment, this asymmetric style of communication may be potentially likely in a mobile ad hoc network.

In an example embodiment, communications devices that receive a message can retransmit the message in accordance with the scalable wireless geocast protocol. For example, a communication device's ability to retransmit a message can be based on the number of times the message was previously received, the communication device's proximity with respect to the communications devices from which the message was sent, and/or the communication device's proximity to the geocast region. This can be implemented as a three step location-based approach, which is described in detail in the aforementioned U.S. Pat. No. 7,525,933. First, in accordance with the location-based approach, the receiving communication device determines whether it has previously received the same query/response at least a predetermined number (N) of times. If not, it retransmits the query/response over the ad hoc network of communications devices. If so, the communications device progresses to the second step and determines whether the sending communications device is closer than some minimum distance away. If no prior transmitter of the query/response was closer than some minimum distance away, the communications device retransmits the query/response over the ad hoc network of communications devices. Otherwise, the communications device progresses to the third step and determines whether it is closer to the center of the geocast region than any sending communications device from which the query/response was received. If so, the communications device transmits the query/response over the ad hoc network of communications devices. If not, the communications device does not retransmit the query/response.

This location-based approach prevents the receiving communications device from retransmitting a message that was most likely already retransmitted by another communications device located close to it (and thus most likely reaching the same neighboring communications devices that it can reach). In addition, this location-based approach reduces the chance that the communications device will retransmit the same message multiple times to the same neighboring communications devices.

As mentioned above, a mobile ad hoc network does not require a communications network infrastructure or a Wi-Fi access point. However, in an example configuration, a mobile ad hoc network can utilize Wi-Fi access points and/or a communications network infrastructure.

Figure 2:
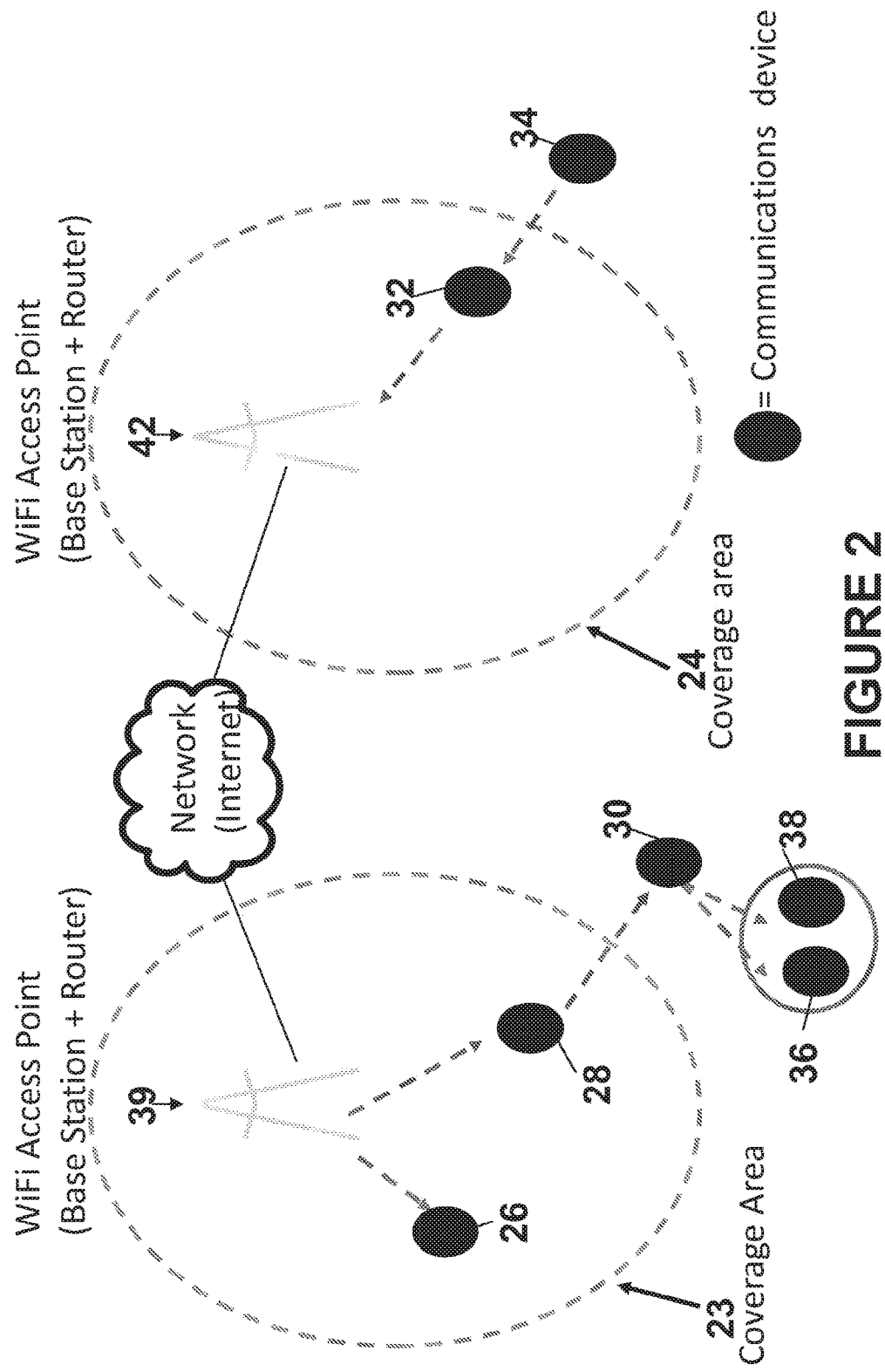
FIG. 2 illustrates an example ad hoc network utilizing a Wi-Fi access point.

FIG. 2 illustrates an example ad hoc network utilizing a Wi-Fi access point. As depicted in FIG. 2, communication devices 26, 28, 30, 36, and 38 form a mobile ad hoc network and communication device 32 and 34 form another mobile ad hoc network. Coverage area 23, which is the area covered by a Wi-Fi access point 39, covers communication devices 26 and 28. Coverage area 24, which is the area covered by another WiFi access point 42 covers communication device 32. As shown in FIG. 2, communication device 34 transmits to communication device 32 directly (e.g., via Bluetooth). Communication device 32 retransmits to a WiFi access point 42 which in turn may retransmit to the other WiFi access point 39 via a network such as the Internet, for example. Communication devices 26 and 28 receive the transmission from the WiFi access point 39, and communication device 28 retransmits directly to communication device 30. And, as depicted, communication device 30 retransmits to other communication devices 36 and 38.

Figure 3:
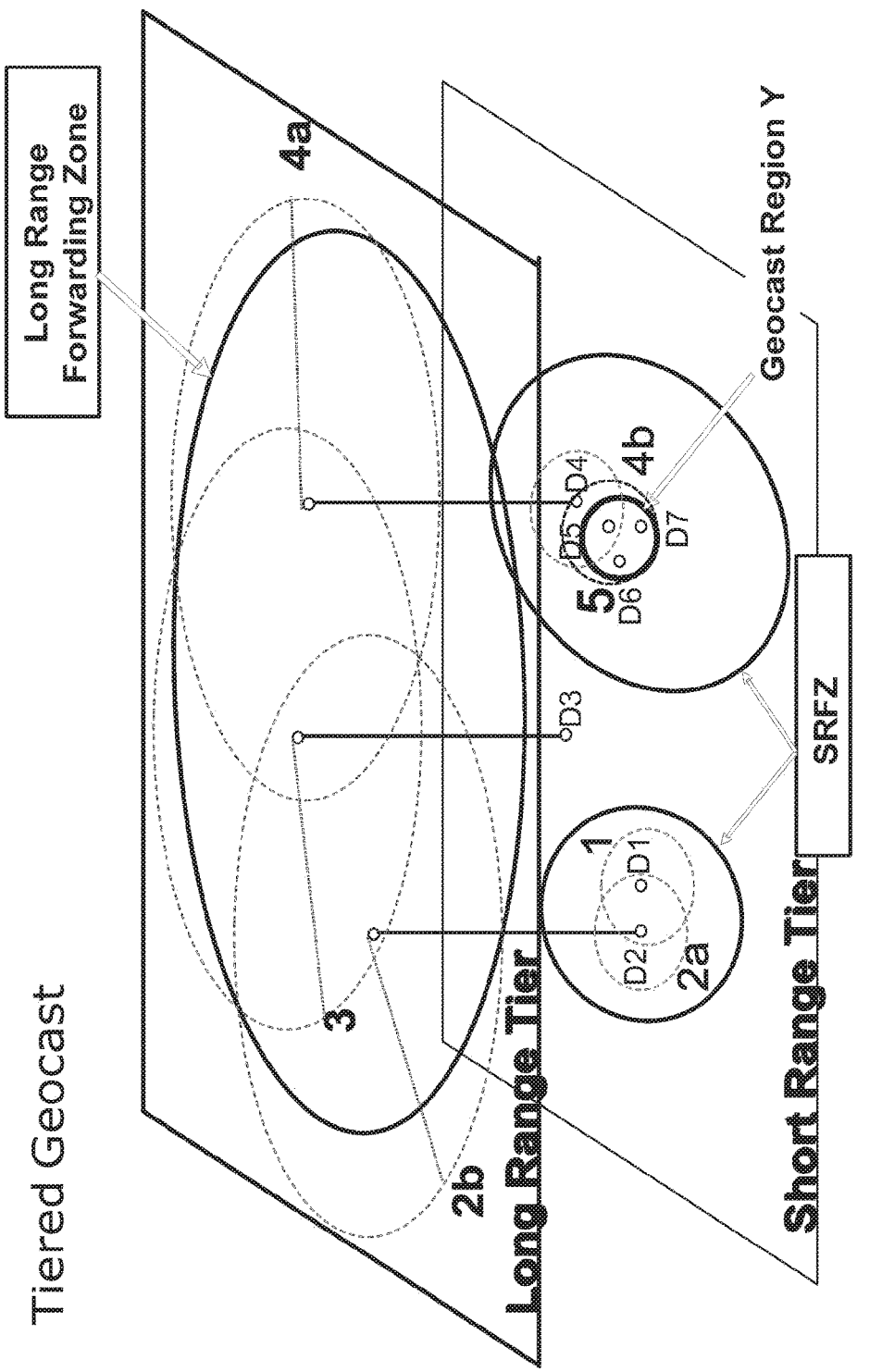
FIG. 3 illustrates an example mobile ad hoc network in which the GFT protocol may be implemented utilizing tiered geocasting and forwarding zones.

FIG. 3 illustrates an example mobile ad hoc network in which geocast-based transfer may be implemented utilizing tiered geocasting and forwarding zones. Tiered geocasting uses long range (LR) transmitters (such as communications devices, etc.), infrastructure, a communications network, a cellular tower, or a combination thereof, when available. Tiered geocasting assumes that at least one tier is usable by at least one of the communications devices. A long range tier is a tier wherein characteristic message transfers between devices occur over a longer physical range than those over some other tier. A long range tier can be wireless, wired, or a combination thereof.

A forwarding zone can be utilized to implement tiered geocasting. A common forwarding zone can be defined for all geocast packets or different forwarding zones can be defined for each type of geocast packet. Forwarding zones (as shown in FIG. 3, for example and without limitation) can be defined differently in different tiers, even for the same packet type or even same packet. Thus, forwarding heuristics can be applied independently per tier, with bridging at multi-tier capable nodes. In an example embodiment, a communications device retransmits a packet only if the communications device is located within the forwarding zone defined for the packet's type. This determination is in addition to the determinations described above and, if the communications device is not in the forwarding zone, the packet will not be retransmitted, even if one or more of the above conditions would otherwise have caused a retransmission hold.

As depicted in FIG. 3, nodes (e.g., communications devices) D1, D2, D3, D4, D5, D6, and D7, are at various locations within short range (SR) and long range (LR) tiers. All of devices D1, D2, D3, D4, D5, D6, and D7 together form a mobile ad hoc network, with devices D5, D6, and D7 being located in geocast region Y, hence being targets of a message sent by D1. Each communications device D1, D2, D3, D4, D5, D6, and D7 can determine its own geographical location through any type of location determination system including, for example, the Global Positioning System (GPS), assisted GPS (A-GPS), time difference of arrival calculations, configured constant location (in the case of non-moving nodes), any combination thereof, or any other appropriate means. Each communications device is operable to transmit and receive packets on a mobile ad hoc network. In addition, at any given time, some subset (possibly all) of the communications devices may be operable to transmit and receive packets over the long range tier network. For example, though not a limitation, in FIG. 3, devices D2, D3, and D4 can transmit and receive messages over both the short and long range tiers. Note that this latter fact is indicated visually in the diagram by D2, D3, and D4 each having two dots (one in the short range tier and one in the long range tier) connected by a vertical line. The long-rang tier network can be any network in which packets can be transmitted from one long range capable communications device to another long range capable communications device. Such packet networks can include, for example, an infrastructure-based network comprising wireless base stations (for up- and down-link) operating on a separate frequency from that used by an ad hoc network. In addition, the long rang tier network also could be implemented simply as another instance of an ad hoc network using distinct radio frequencies and possibly longer radio ranges.

Communications device D1 transmits the message, and communications device D2 receives the transmission from communications device D1. Communications device D2 retransmits (transmission 2a), within the short range tier and in accordance with the heuristics for the short range forwarding zone (SRFZ) as well as within the long range tier (transmission 2b). Communications D2, with long range transmission capability (in the long range tier) retransmits in the long range tier as well (transmission 2b). Communications device D3 receives the transmission 2b from communications device D2 and retransmits (as transmission 3) in the long range tier only. Communications device D4 receives the transmission 3 from communications device D3 and retransmits both on the long and short range tiers, resulting in transmission 4a in the long range tier and 4b in the short range tier. Communications device D5, within geocast region Y, receives the transmission 4a, and in turn retransmits (transmission 5) within the geocast region Y. Transmission 5 is received by the other devices in geocast region Y, namely devices D6 and D7, thus completing the geocast message transfer.

Geocast origination, destination, and termination regions can be defined by geographic parameters and may have any size and shape. As examples, the regions may be defined by three or more bounding geographic coordinates, forming a triangle, rectangle, or other shape, or a single geographic coordinate and a radius or diameter, forming a geocast region.

FIG. 4, comprising FIG. 4A, FIG. 4B, FIG. 4C, FIG. 4D, and FIG. 4E depicts example geocast regions or boundaries. A geocast region may be defined to be a single point 50, as depicted in FIG. 4A. A point geocast region may be defined by a longitude value and a latitude value (not shown). A point above the surface of the earth could be defined by providing an altitude value in addition to longitude and latitude values. A geocast region may also comprise multiple single points (not shown) such as the single point 50. Location points such as point 50 may be used as the building blocks for more complex geocast region geometries, as described herein. FIG. 4B depicts a geocast region defined by a point 50 in combination with a radius 52. The geocast region of this example may comprise the area enclosed by the radius, and may include the space above the area as well. A geocast region could also be defined as the overlap region between two or more circular geocast regions (not shown). FIG. 4C depicts a more complex geometry formed from a series of points 50 interconnected with straight boundary lines. This technique of geocast region definition is similar to the techniques typically used in the definition of parcels of real property. FIGS. 4D and 4E depict the creation of one or more geocast regions within a single geographic footprint. FIG. 4D depicts creating a geocast region for a specific floor of a building 56. The single floor geocast region is defined as the volume of space between upper and lower areas, each formed using a series of points 50 set at corners of the buildings. FIG. 4E depicts an alternate technique for defining a single floor geocast region in building 56. Upper and lower points 50 are defined in the middle of the ceiling and the floor of the geocast region respectively. The single floor geocast region is then defined as the volume of space between an upper area and a lower area defined by a pair of radii 52 extending from the middle points. Geocast regions may also be defined to change in size, geographic location, etc. with time (not shown), essentially allowing the creation of geocast regions in four dimensions. For example a region may be defined to change size, shape, and/or geographic location over time as the number of participating nodes fluctuates. Information defining a particular geocast region (e.g., a series of points) can be communicated in an addressing portion of a geocast message. Geocast sub-regions may be defined within a particular geocast region using the above techniques. It should be noted that the techniques described with reference to FIGS. 4A-4E are merely examples, and the scope of the instant disclosure should not be limited thereto. Other region geometries and techniques for defining regions may be recognized by those skilled in the art, and are meant to be included within the scope of the instant disclosure.

In some embodiments, a geocast region can be selected by making one or more selections on a map and/or from a list. A region can be selected from a list displayed on a mobile communications device, or the like. The list can comprise real world locations. For example, one can scroll through a list by touching the display surface of a mobile communications device, or the like, by providing a voice command (e.g., "Scroll List"), by entering text on which to search, by moving the device, or any appropriate combination thereof. In another example embodiment, the selection of a region, or the like can be made by selecting a location on the map by a finger, fingers, and/or any other appropriate device, and, for example, dragging away or gesture-pinching, from the selected location to create the size of the a circle, oval, rectangular, square, polygon, or any appropriate shape (two dimensional or three dimensional) representing a destination, termination, boundary, region, or the like. In various example embodiments, locations, such as addresses, and/or region dimensions, building names, institution names, landmarks, etc. may be input in other ways by a player, such as by typing, gesture, and/or voice input. Indeed, many variations of textual, graphical, and audio inputs, either alone or in combination, may be utilized for selecting a geocast region in accordance with example embodiments of the present disclosure.

As described above, geocast-based file transfer may be implemented via use of a Geocast File Transfer (GFT) protocol. In accordance with the GFT protocol, sending devices and receiving devices may perform various functions. For example, a sending device may parse a file into multiple chunks. Respective multiple geocast packets comprising the chunks may be geocast. In an example embodiment, the first geocast packet may comprise information about the file (e.g., file name, identification number, total number of chunks in the file, the number of a chunk incorporated in a packet, etc.). In an example embodiment, all geocast packets may comprise information about the file (e.g., file name, identification number, total number of chunks in the file, the number of a chunk incorporated in a packet, etc.). The sending device may geocast all packets sequentially. Upon geocasting all packets, the sending device may wait a predetermined amount of time (referred to as backoff). During the period of time, any receiving device, or devices that did not receive a chunk of the file, may request missing chunk or chunks. The request may be in the form of a geocast message. Receiving devices also may wait various respective amounts of time (backoffs) before geocasting a request for a chunk or chunks. Other receiving devices that may have missed a chunk or chunks, may hear (e.g., receive the geocast request) that the chunk it missed is being requested. If so, that device need not make a request for the chunk or chunks. Rather, that device may wait for the sending device to retransmit (e.g., geocast again) a geocast packet, or packets, containing the missing chunk, or missing chunks.

FIG. 5, FIG. 6, FIG. 7, FIG. 8, FIG. 9, FIG. 10, FIG. 11, FIG. 12, FIG. 13, FIG. 14, FIG. 15, and FIG. 16 depict example processes by which sending and/or receiving devices may implement geocast-based file transfer. The Figures depict an example implementation. However, it is to be understood that the implementation depicted by the Figures is merely an example, and should not be limited thereto.

Figure 5:
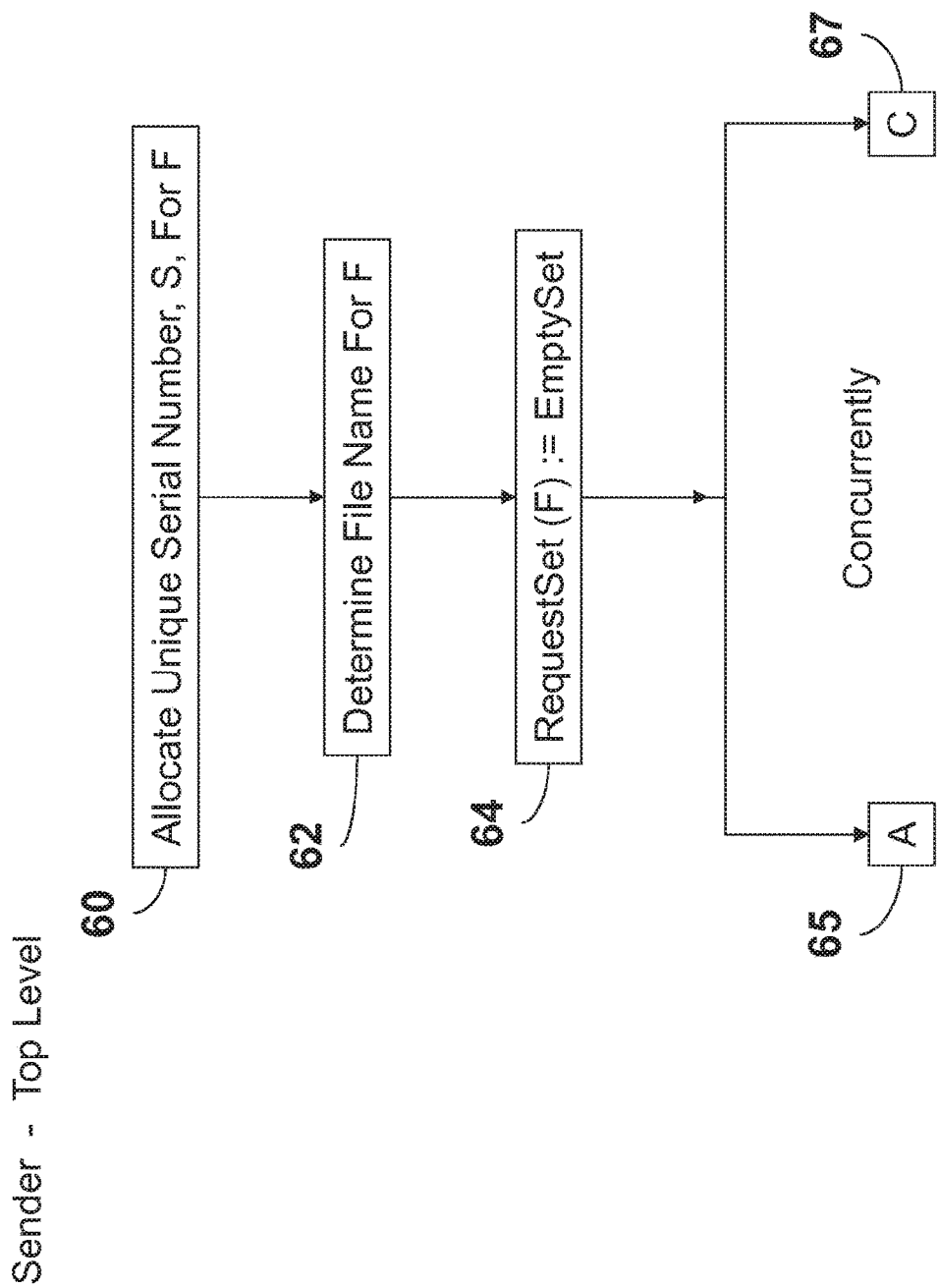
FIG. 5 is a flow diagram of an example process for geocast-based file transfer implemented by a sending device.
Figure 6:
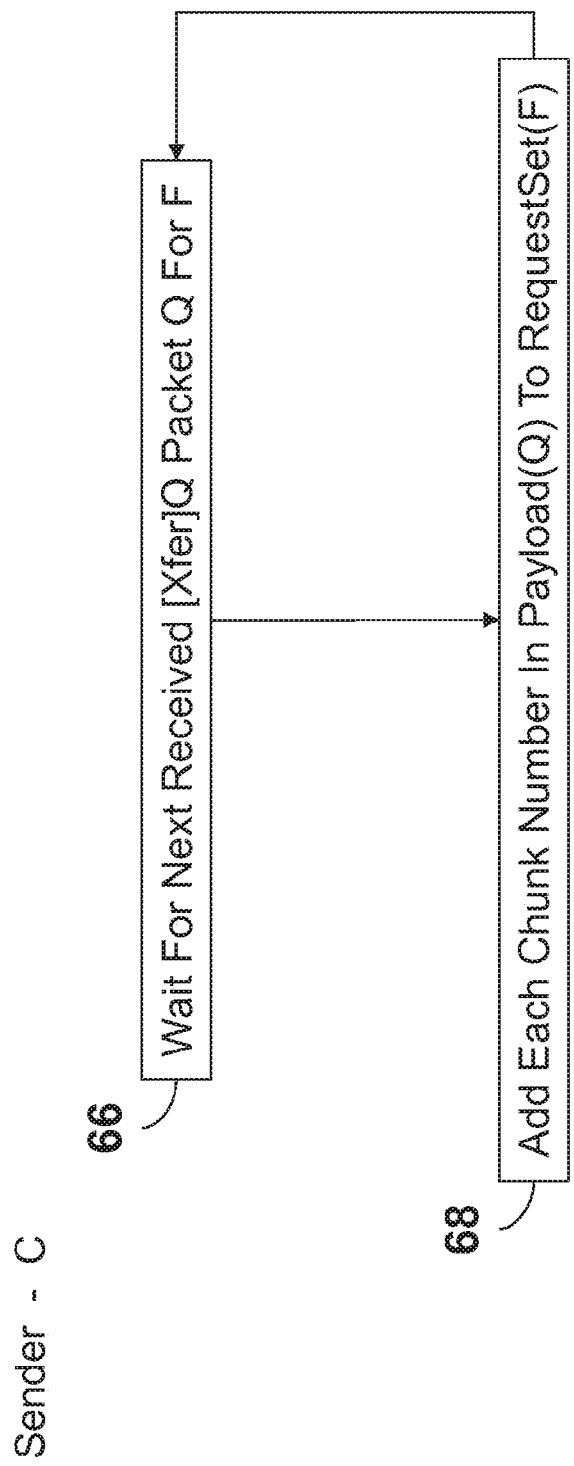
FIG. 6 is another flow diagram of an example process for geocast-based file transfer implemented by a sending device.
Figure 7:
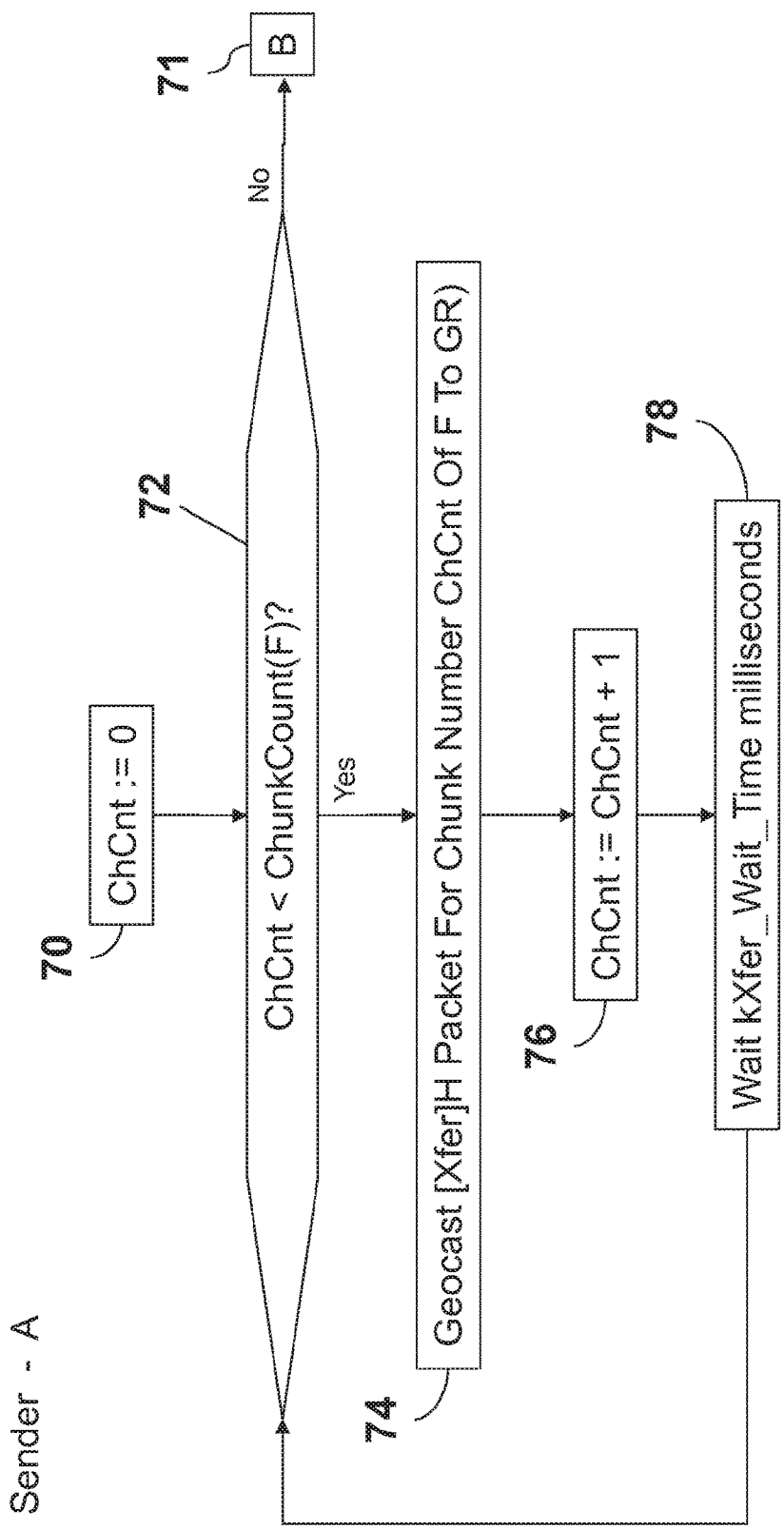
FIG. 7 is another flow diagram of an example process for geocast-based file transfer implemented by a sending device.

FIG. 5 is a flow diagram of an example process for geocast-based file transfer implemented by a sending device. FIG. 5 illustrates example behavior of a sender of a file (F) which is to be transferred to a geocast region (GR). At step 60, the sending device may allocate a unique serial number (depicted as "S" in FIG. 5) to a file (depicted as "F" in FIG. 5). The sending device may determine a file name for the local file, F, at step 62. In an example embodiment, the file name may include ancillary information and/or information identifying the file originator. An indication of the set of requests pending for chunks of the file F (depicted as "RequestSet(F)" in FIG. 5) may be set (initialized) to the empty set at step 64. Steps 65 and 67 may be performed concurrently. The letter "A" at step 65 indicates example processes as depicted in FIG. 7. The letter "C" at step 67 indicates example process as depicted in FIG. 6. Processes A and C may operate concurrently as depicted in FIG. 5.

FIG. 6 is another flow diagram of an example process for geocast-based file transfer implemented by a sending device. The process depicted in FIG. 6 may operate concurrently with the process depicted in FIG. 7. At step 66, the sending device may wait until the embodying device receives the next message tagged as [Xfer]Q for the file F. The [Xfer]Q message may contain fields indicating the file to which it pertains. At step 68, the sending device may add each chunk number extracted from the [Xfer]Q message payload to requestSet(F).

Figure 8:
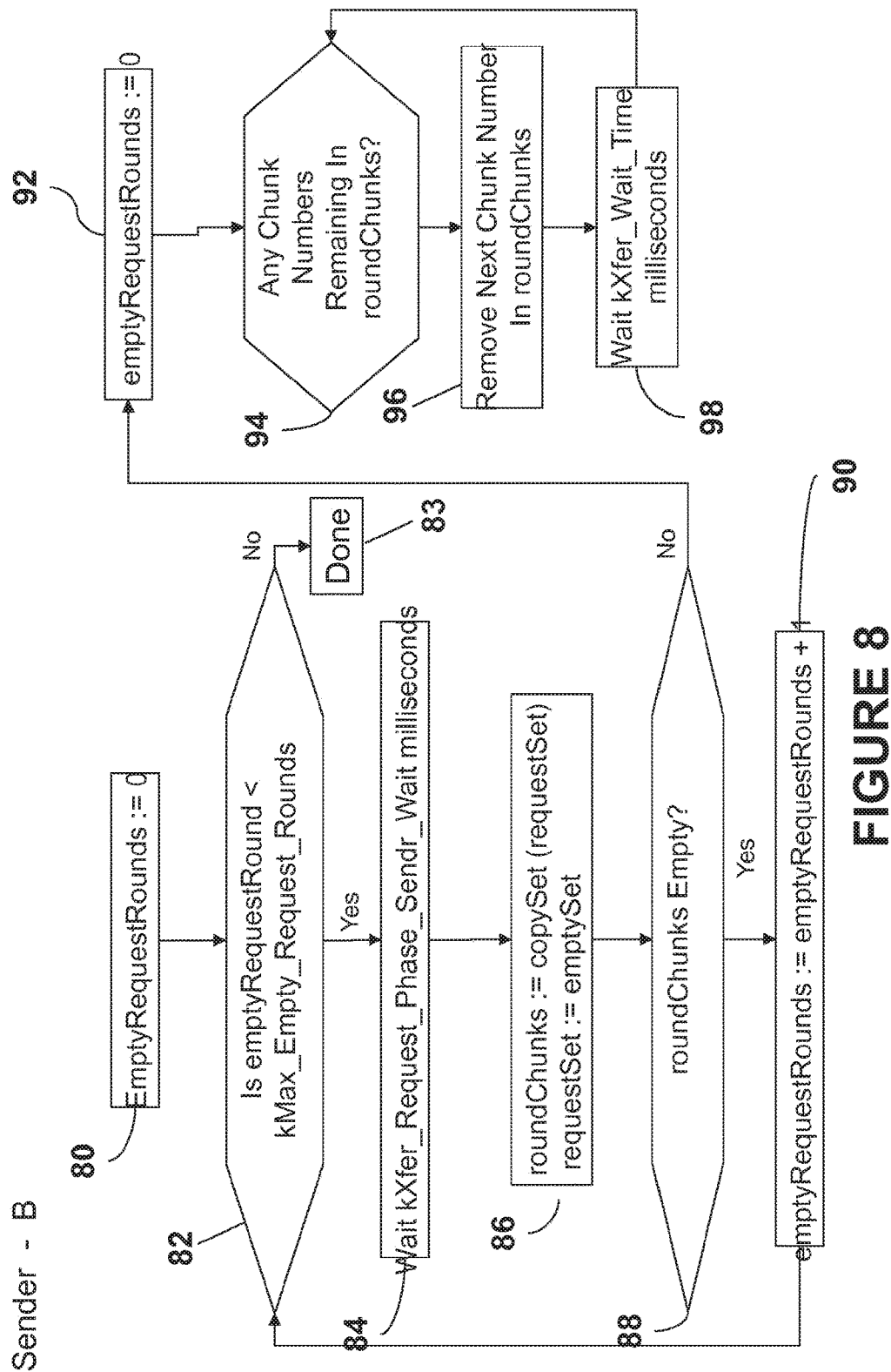
FIG. 8 is another flow diagram of an example process for geocast-based file transfer implemented by a sending device.

FIG. 7 is another flow diagram of an example process for geocast-based file transfer implemented by a sending device. The process depicted in FIG. 7 may operate concurrently with the process depicted in FIG. 6. ChCnt represents an integer variable counting the chunks sent so far by sender. At step 70, the sending device may initialize ChCnt to 0. At step 72, the sending device may test whether ChCnt is still less than the number of chunks in F. If not, the process may proceed to process "B". That is, if ChCnt is not less than the number of chunks in F (determined at step 72), the process depicted in FIG. 7 may proceed to the process depicted by the letter "B". The letter "B" indicates an example process as depicted in FIG. 8. If ChCnt is less than the number of chunks in F (determined at step 72), the sending device may geocast an [Xfer]H packet for chunk number ChCnt of F to the geocast region GR to which F is to be sent. This geocast packet may be formatted according to the [Xfer]H packet format and may include bytes taken from F comprising the ChCnt'th chunk of F. At step 76, ChCnt may be incremented by 1. At step 78, the sending device may wait a fixed (e.g., predetermined) duration of length kXFER_WAIT_TIME milliseconds. In an example embodiment, kXFER_WAIT_TIME may be an integer constant. The value of kXFER_WAIT_TIME may comprise any appropriate value, such as, for example, 100 milliseconds. At the end of the wait time (kXFER_WAIT_TIME), e.g., when kXFER_WAIT_TIME has elapsed, the process may proceed to step 72 and continue therefrom.

FIG. 8 is another flow diagram of an example process for geocast-based file transfer implemented by a sending device. The process depicted in FIG. 8 may operate concurrently with the process depicted in FIG. 7 and/or concurrently with the process depicted in FIG. 6. At step 80, the sending device may initialize an integer variable emptyRequestRounds to 0. At 72 the sending device may determine if the value of emptyRequestRounds is less that the value of kMAX_EMPTY_REQUEST_ROUNDS. If the value of emptyRequestRounds is not less than the value of kMAX_EMPTY_REQUEST_ROUNDS (determined at step 82), the process may end at step 83. If the value of EmptyRequestRounds is less than the value of kMAX_EMPTY_REQUEST_ROUNDS (determined at step 82), at step 84, the sending device may wait for a fixed (e.g., predetermined) duration of time equal to kXFER_REQUEST_PHASE_SENDER_WAIT milliseconds. The value of kXFER_REQUEST_PHASE_SENDER_WAIT may comprise any appropriate value, such as, for example, 3000 milliseconds. At step 86, (at the end of the wait period in 84) the sending device may initialize the set-valued variable roundChunks to a copy of the set in requestSet(F). The sending device also may then subsequently change the value of requestSet(F) to empty. At step 88, the sending device may determine if roundChunks is empty. If roundChunks is determined, at step 88, to be empty (the test passes), the sending device may increment a variable represented as emptyRequestRounds, at step 90. If roundChunks is determined, at step 88, not to be empty (the test failed), the sending device may, at step 92, set emptyRequestRounds to 0. At step 94, the sending device may determine if any chunk numbers remain in roundChunks. If it is determined, at step 94, that that there are chunk numbers remaining in roundChunks (e.g., the test passed), at step 96 the sending device may remove a chunk number from roundChunks and may format and geocast an [Xfer]H packet appropriately for that chunk number to the geocast region GR to which F is to be transferred. At step 98, the sending device may wait a fixed (e.g., predetermined) duration of kXFER_WAIT_TIME milliseconds. The value of kXFER_WAIT_TIME may comprise any appropriate value, such as, for example, 100 milliseconds. From step 98, the process may proceed to step 94 and continue therefrom.

Figure 9:
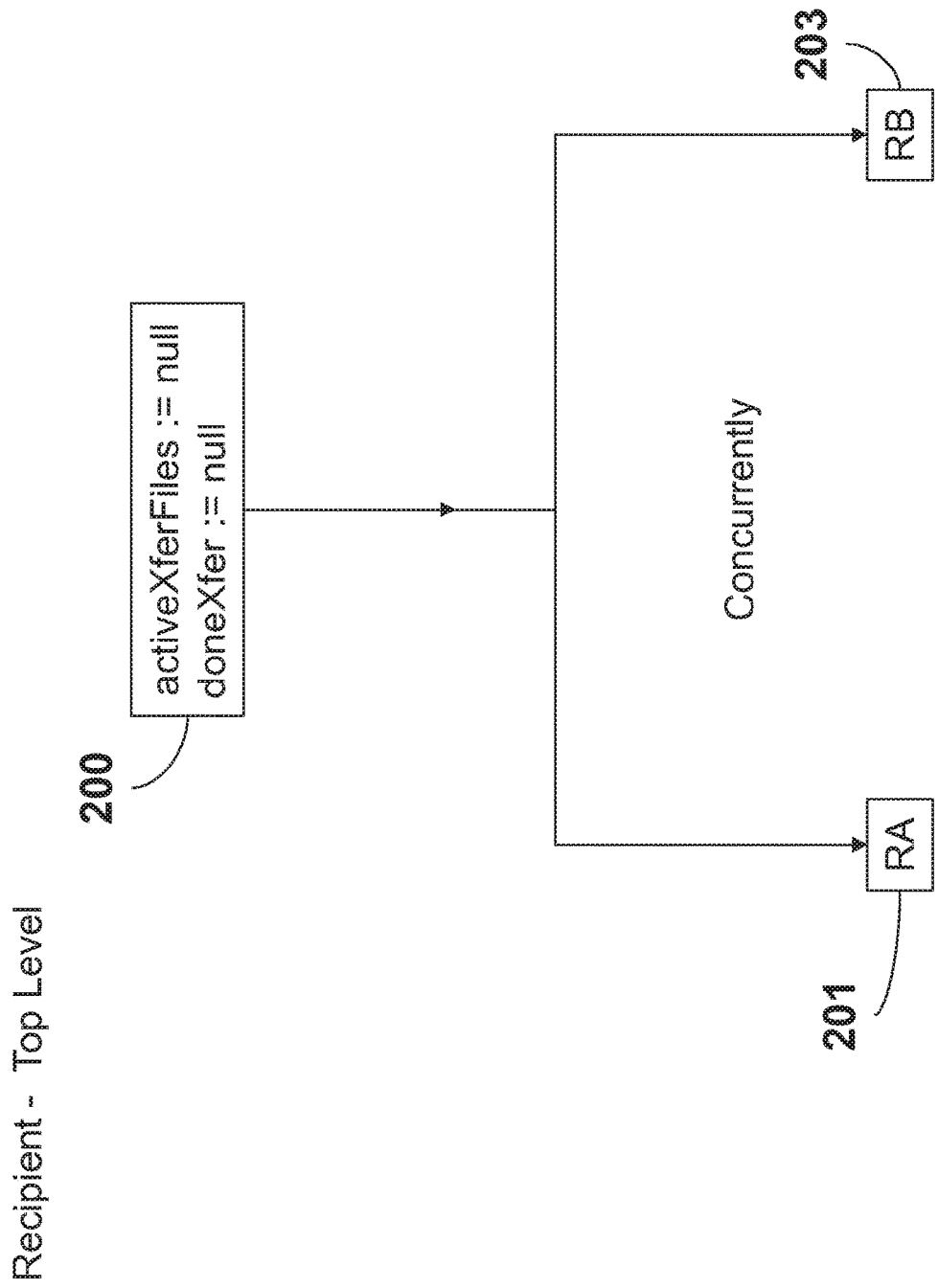
FIG. 9 is a flow diagram of an example process for geocast-based file transfer implemented by a receiving device.
Figure 10:
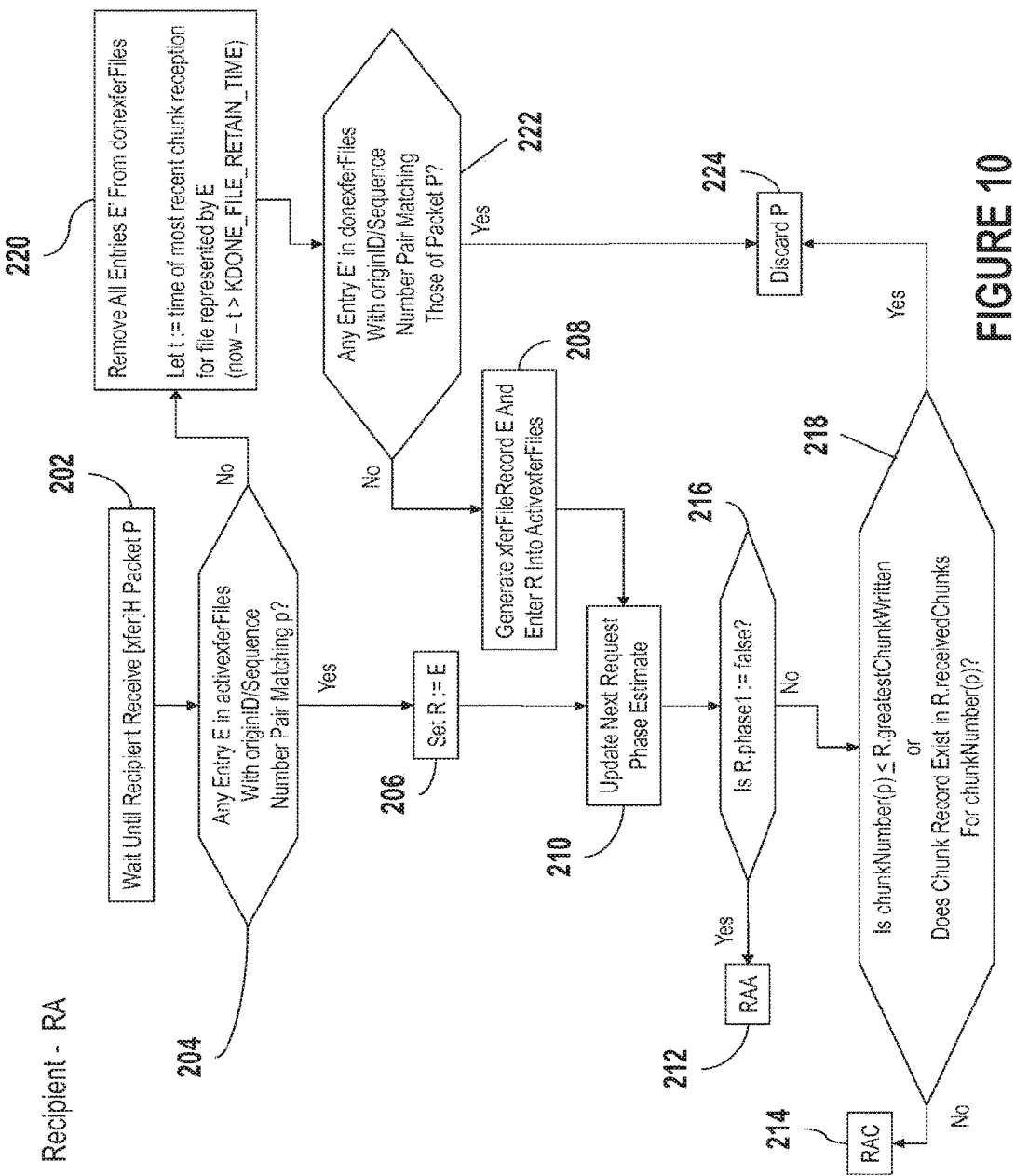
FIG. 10 is a flow diagram of an example process for geocast-based file transfer implemented by a receiving device.
Figure 14:
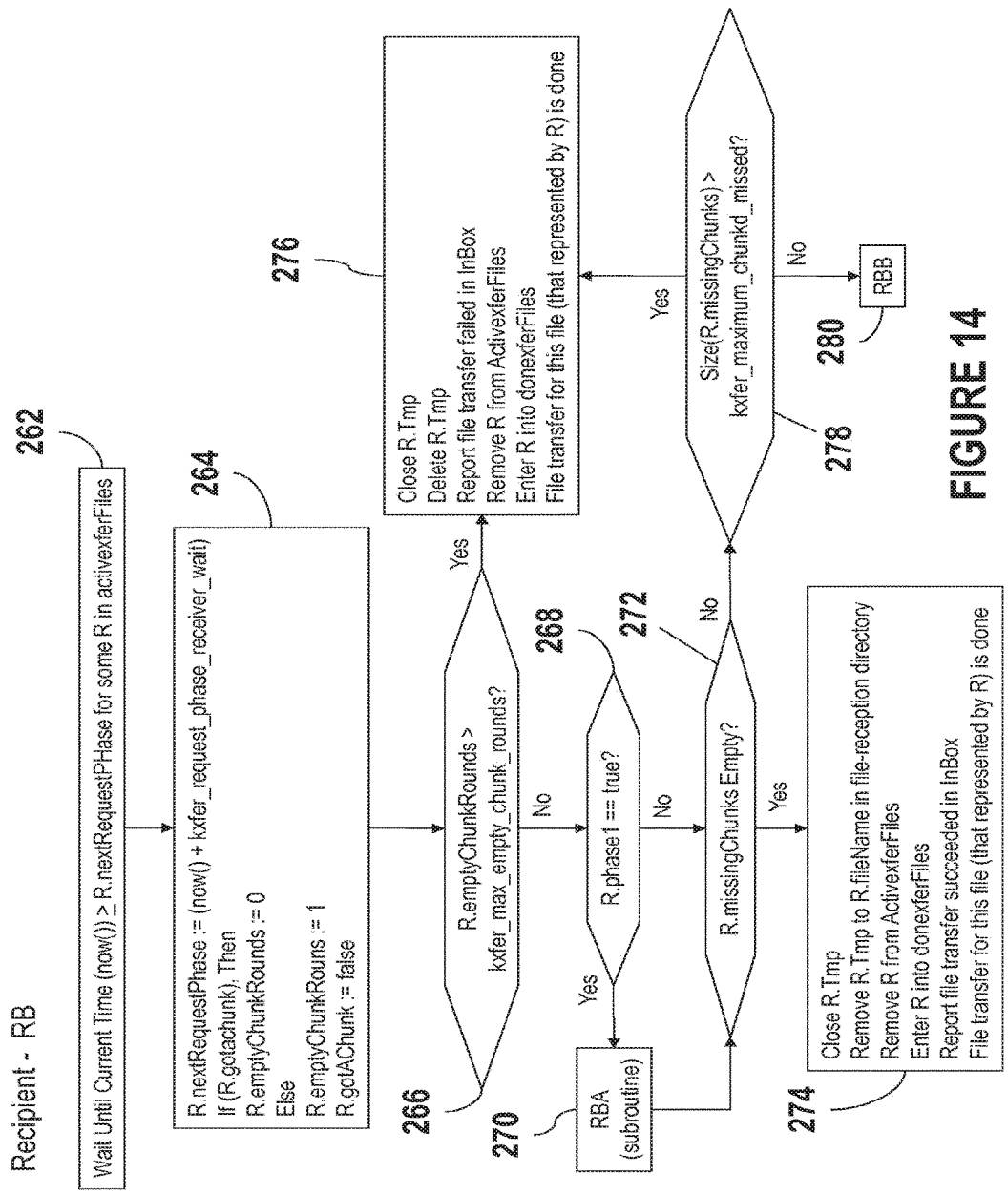
FIG. 14 is another flow diagram of an example process for geocast-based file transfer implemented by a receiving device

FIG. 9 is a flow diagram of an example process for geocast-based file transfer implemented by a receiving device. The process depicted in FIG. 9 illustrates an example process for a recipient device (also referred to as a receiving device) located in the geocast region GR to which the file F is to be transferred. At step 200, the recipient device may initialize to empty two lists of data structures representing files either being received or already having been received, respectively. Recipient devices may concurrently execute process RA, depicted as step 201 and process RC, depicted as step 203. Steps 201 and 203 may be performed concurrently. The label "RA" at step 201 indicates an example process as depicted in FIG. 10. The label "RB" at step 203 indicates an example process as depicted in FIG. 14. Processes RA and RB may operate concurrently as depicted in FIG. 9.

FIG. 10 is a flow diagram of an example process for geocast-based file transfer implemented by a receiving device (also referred to as a recipient device). The process depicted in FIG. 10 may operate concurrently with the process depicted in FIG. 14. At step 202, the recipient device may wait until the embodying device receives a message or packet P tagged as [Xfer]H. (It is to be understood that a geocast message may comprise a single packet or may, in alternative embodiments, comprise other than a single packet. For definiteness in this description, we refer to it as a packet with the understanding that such is not intended to be limiting.) At step 204, the recipient device may determine whether any entry E exists in activeXferFiles such that E's origin ID and sequence number match those exposed in the received packet P. If it is determined at step 204 that an entry E exists in activeXferFiles such that E's origin ID and sequence number match those exposed in the received packet P (the test passed), the recipient device may initialize a variable R to point to entry E. If it is determined at step 204 that no entry E exists in activeXferFiles such that E's origin ID and sequence number match those exposed in the received packet P (the test failed), the recipient device, at step 220, may remove all entries E' in doneXferFiles that are older than a fixed age threshold. At step 222, the recipient device may determine whether any entry E' still remaining in doneXferFiles has matching origin ID and sequence number to those extracted from P. If it is determined, at step 222, that an entry is still remaining in doneXferFiles that has a matching origin ID and sequence number to those extracted from P (test passed), the recipient device may, at step 224, discard the packet P. If it is determined, at step 222, that no entry is still remaining in doneXferFiles that has a matching origin ID and sequence number to those extracted from P (test failed), the recipient device may generate, at step 208, a new file data structure for the file to be received and may set R to it. And the recipient device may enter R into the activeXferFiles list. In an example embodiment, R's fields may be initialized as follows.

R.receivedChunks: empty list—this is a list of chunks received but not yet written to permanent storage R.greatestChunkWritten: −1—integer chunk number of greatest one written to permanent storage R.Tmp: operating system file temporary file. Recipient initializes by opening new, uniquely named temporary file R.missingChunks: empty list—list of chunks not received (gaps in sequence)

R.phase1: true—boolean flag representing whether process is in first phase

R.originPosition: origin latitude/longitude values from packet P

R.geocastRegion: center, radius of geocast region from packet P

R.nextRequestPhase: time:=now+estimate contained in P from sender

R.gotAChunk: false—boolean flag indicating whether received chunk in current phase R.emptyChunkRounds: 0—number of chunk rounds gone through without receiving a chunk R.filename: file name in packet P determined by sender.

Figure 11:
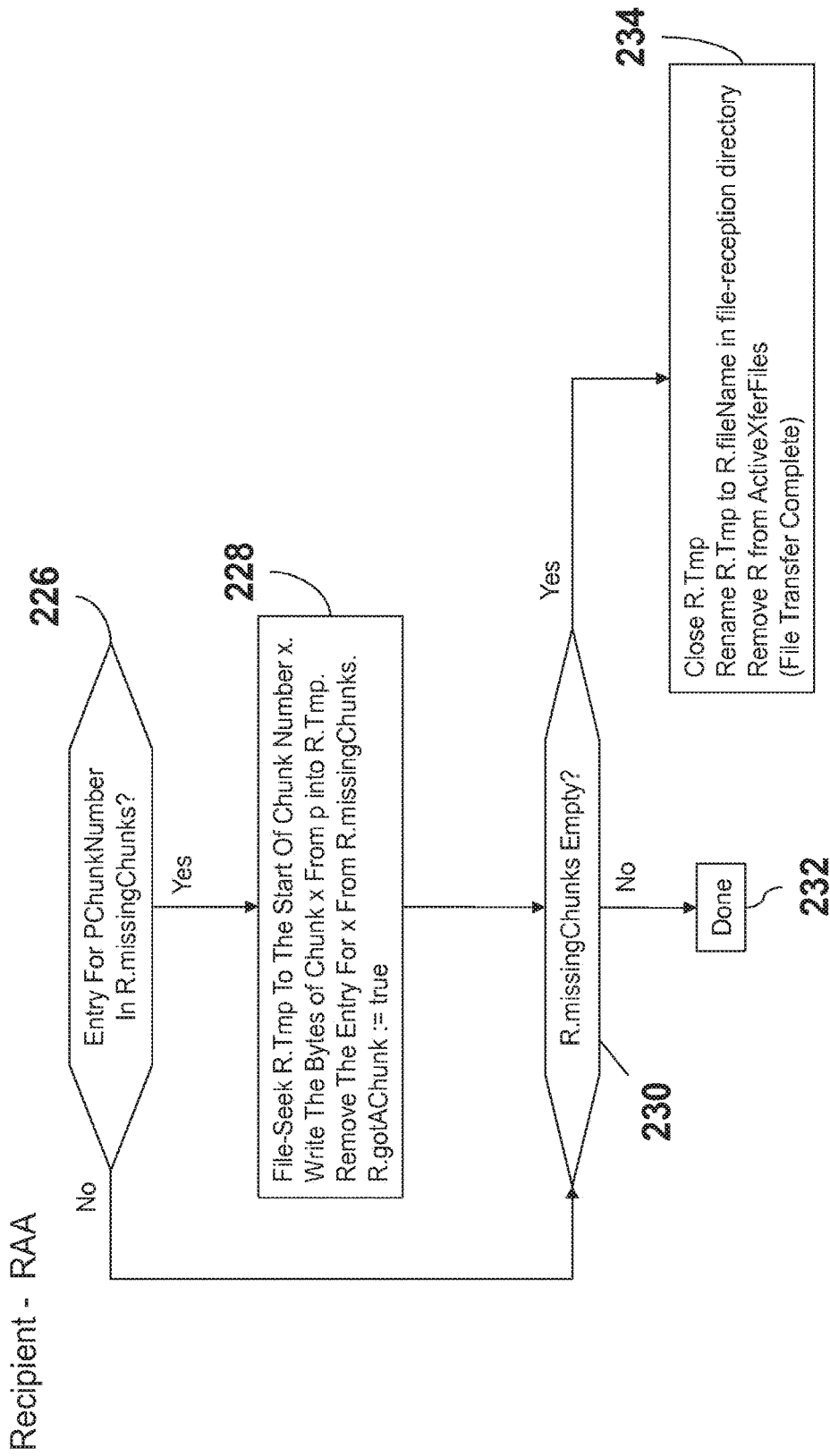
FIG. 11 is another flow diagram of an example process for geocast-based file transfer implemented by a receiving device.
Figure 12:
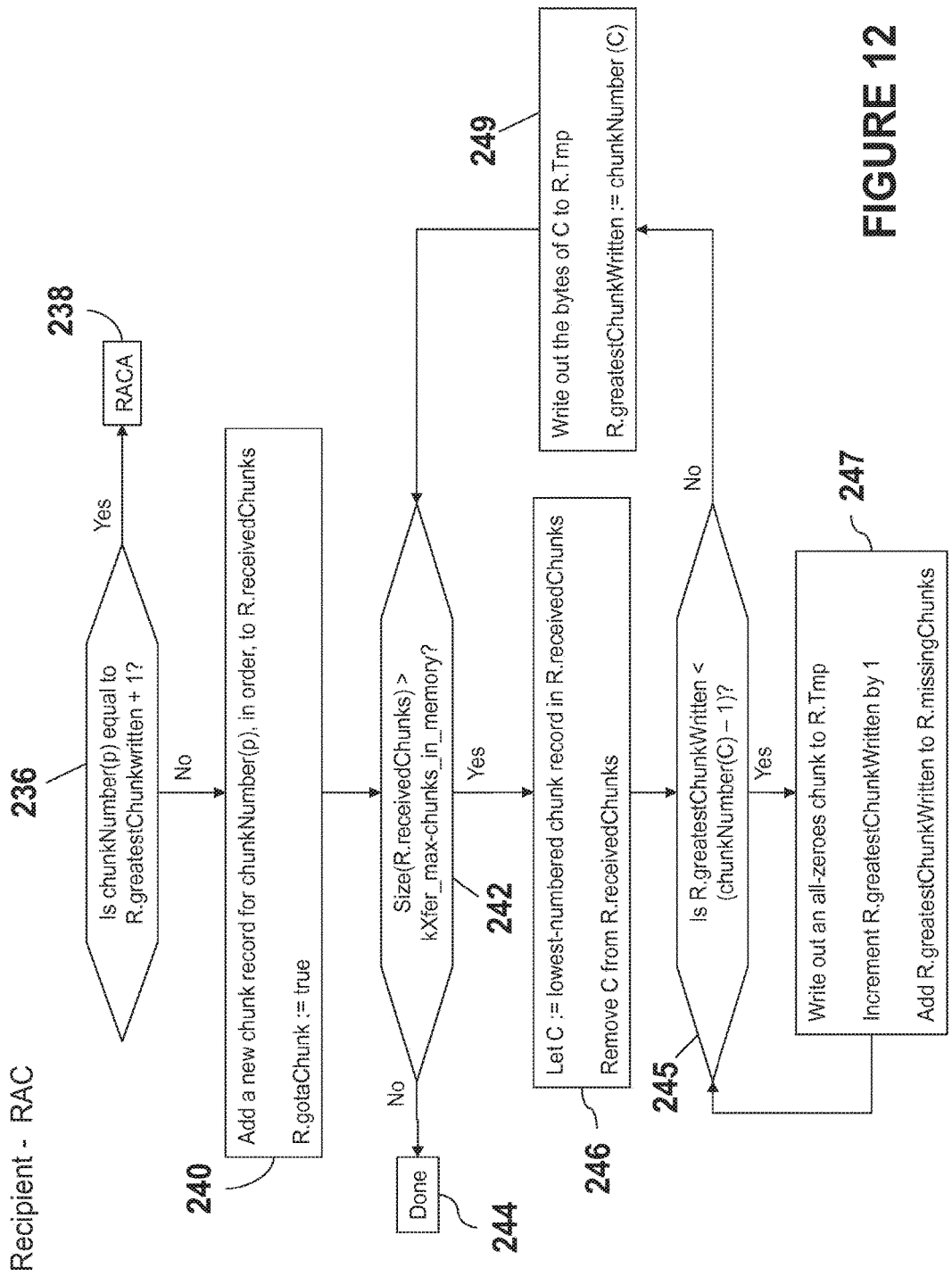
FIG. 12 is another flow diagram of an example process for geocast-based file transfer implemented by a receiving device.

At step 210, the recipient device may update its estimate of the beginning of the next request phase by first adding estimate value from P to current time, then if the result is greater than R.nextRequestPhase then set R.nextRequestPhase to it. At step 216, the recipient device may determine if R.phase1 is false. If it is determined, at step 216, that R.phase1 is false, the process may proceed to process RAA at step 212. The process RAA is depicted in FIG. 11. If it is determined, at step 216, that R.phase1 is not false ("No" branch), the recipient device may determine, at step 218, if the chunk number contained in P is less than or equal to R.greatestChunkWritten or if a chunk record already exists in R.receivedChunks for it. If it is determined, at step 218, that a chunk number contained in P is not less than or equal to R.greatestChunkWritten or a chunk record does not already exist in R.receivedChunks for it, the process may proceed to process RAC at step 214. Process RAC is depicted in FIG. 12. If it is determined, at step 218, that a chunk number contained in P is less than or equal to R.greatestChunkWritten or a chunk record does already exist in R.receivedChunks for it, the recipient device may, at step 224, discard the packet P.

FIG. 11 is another flow diagram of an example process for geocast-based file transfer implemented by a receiving device. FIG. 11 depicts the process RAA depicted in FIG. 10. At step 226, the recipient device may determine if there is an entry for the chunk number extracted from P within the R.missingCHunks list. If it is determined, at step 226, that there is an entry for the chunk number extracted from P within the R.missingCHunks list (test passes), the recipient device, at step 228, may seek the file write pointer for R.Tmp to the starting position of chunk number extracted from P. The recipient device may then copy the bytes of the chunk from P's payload into the file R.Tmp. The recipient device also may remove the entry for this chunk number from R.missingChunks. If it is determined, at step 226, that there is no entry for the chunk number extracted from P within the R.missingCHunks list (test failed), the recipient device, at step 230, may determine if R.missingChunks is empty. If it is determined, at step 230, that R.missingChunks is not empty, the process may terminate at step 232. If it is determined, at step 230, that R.missingChunks is empty, the recipient device, at step 234, may conclude file transfer successfully by closing R.Tmp, renaming R.Tmp to the filename R.filename and removing R from activeXferFiles and entering it into doneXferFiles.

Figure 13:
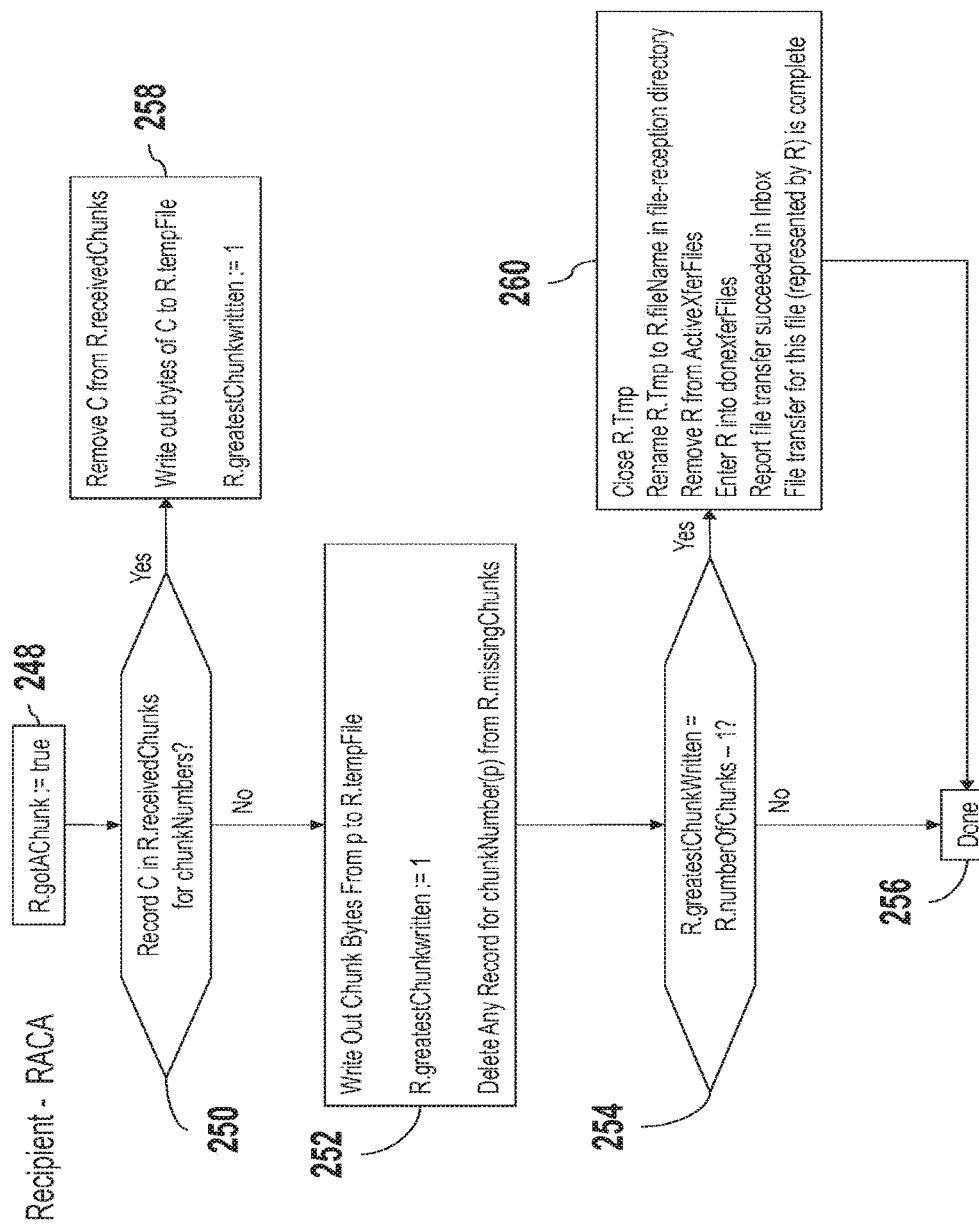
FIG. 13 is another flow diagram of an example process for geocast-based file transfer implemented by a receiving device.

FIG. 12 is another flow diagram of an example process for geocast-based file transfer implemented by a receiving device. FIG. 12 depicts the process RAC depicted in FIG. 10. At step 236, the recipient device may determine if the chunk number in packet P is one greater than R.greatestChunkWritten. If it is determined, at step 236, that the chunk number in packet P is one greater than R.greatestChunkWritten (test passed), the process may proceed to process RACA at step 238. Process RACA is depicted in FIG. 13. If it is determined, at step 236, that the chunk number in packet P is not one greater than R.greatestChunkWritten (test failed), the recipient device, at step 240, may add a new chunk record for the chunk number from packet P, in order, to R.receivedChunks, and may set R.gotAChunk to true. At step 242, the recipient device may determine if the R.receivedChunks set is now greater than the constant limit kXFER_MAX_CHUNKS_IN_MEMORY. If it is determined, at step 242, that the R.receivedChunks set is not greater than the constant limit kXFER_MAX_CHUNKS_IN_MEMORY (test failed), the process may terminate at step 244. If it is determined, at step 242, that the R.receivedChunks set is greater than the constant limit kXFER_MAX_CHUNKS_IN_MEMORY (test passed), the recipient device, at step 246, may set a variable C to the lowest-numbered chunk record in R.receivedChunks, and may remove C from that list. At step 245, the recipient device may determine if R.greatestChunkWritten is less than (chunk number C)−1. If it is determined, at step 245, that R.greatestChunkWritten is less than (chunk number C)−1 (test passed), the recipient device, at step 247, may write out an all-zeroes chunk to R.Tmp, may increment R.greatestChunkWritten by one, and may add R.greatestChunkWritten to R.missingChunks. From step 247, the process may proceed to step 245 and continue therefrom. If it is determined, at step 245, that R.greatestChunkWritten is not less than (chunk number C)−1 (test failed), the recipient device, at step 249, may write out the bytes of C to R.Tmp, and may set R.greatestChunkWritten to (chunk number C). From step 249 the process may proceed to step 242 and continue therefrom.

FIG. 13 is another flow diagram of an example process for geocast-based file transfer implemented by a receiving device. FIG. 13 depicts the process RACA depicted in FIG. 12. At step 248, the recipient device may set R.gotAChunk to true. At step 250, the recipient device may determine if there exists a record C in R.receivedChunks for the chunk number extracted from P. If it is determined, at step 250, that there exists a record C in R.receivedChunks for the chunk number extracted from P (test passed), the recipient device, at step 258, may remove C from R.receivedChunks, may write out the bytes of C to R.Tmp, and may increment R.greatestChunkWritten by one. If it is determined, at step 250, that there does not exist a record C in R.receivedChunks for the chunk number extracted from P (test failed), the recipient device, at step 252, may write the bytes from packet P out to R.Tmp, may increment R.greatestChunkWritten by one, and may delete any record present in R.missingChunks corresponding to the chunk number in P. At step 254, the recipient device may determine if R.greatestChunkWritten is one less than R.numberOfChunks, i.e. the number of chunks in the file, determined when R is initialized from the information in the [Xfer]H packet. If it is determined, at step 254, that R.greatestChunkWritten is one less than R.numberOfChunks determined when R is initialized from the information in the [Xfer]H packet (test passed), the recipient device, at step 260, may conclude file transfer successfully by closing R.Tmp, renaming R.Tmp to the filename R.filename and removing R from activeXferFiles and entering it into doneXferFiles. From step 260, the process may terminate at step 256. If it is determined, at step 254, that R.greatestChunkWritten is not one less than R.numberOfChunks determined when R is initialized from the information in the [Xfer]H packet (test failed), the process may terminate at step 256.

Figure 15:
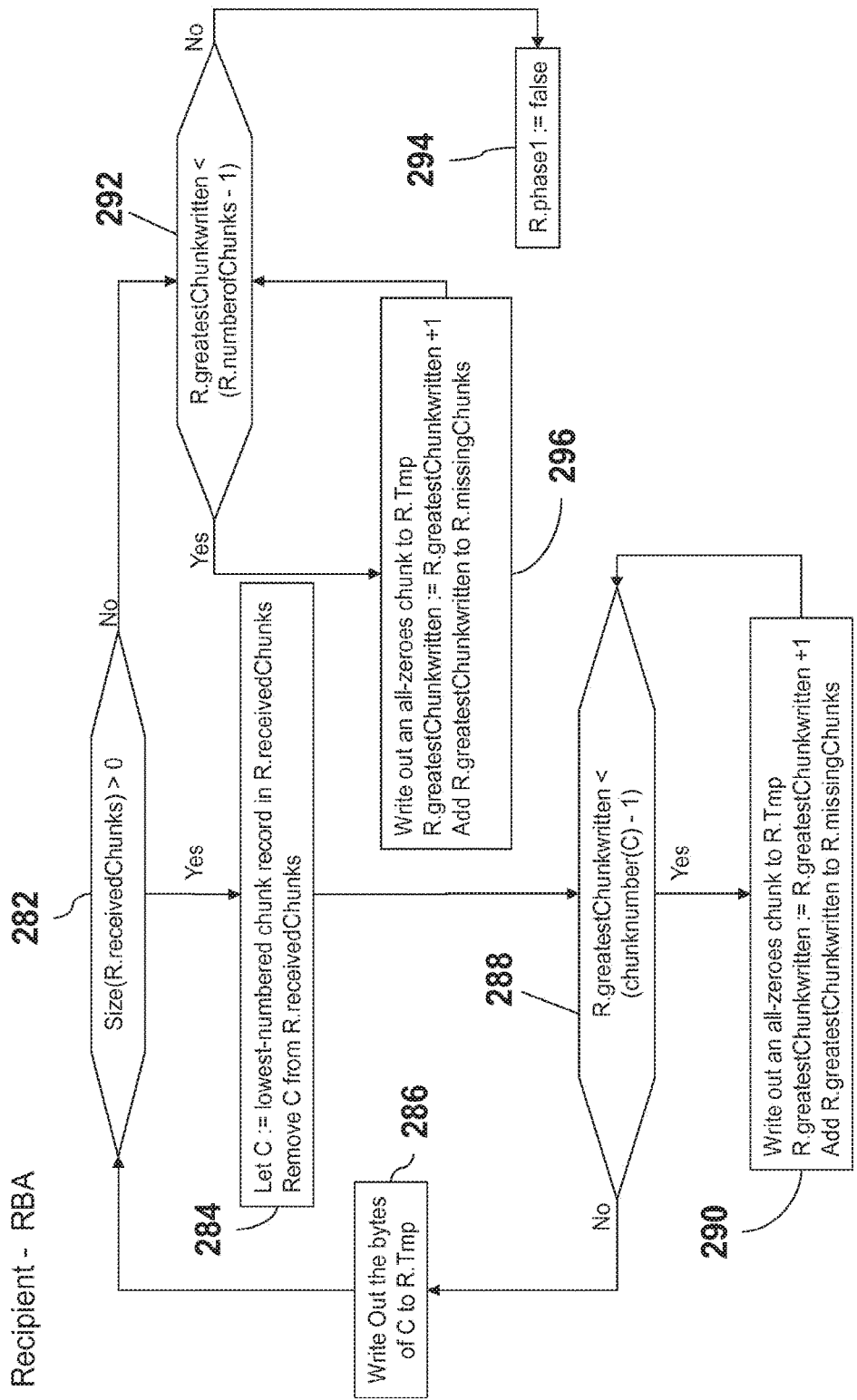
FIG. 15 is another flow diagram of an example process for geocast-based file transfer implemented by a receiving device

FIG. 14 is another flow diagram of an example process for geocast-based file transfer implemented by a receiving device. FIG. 14 depicts the process RB depicted in FIG. 9. The process (RB) depicted in FIG. 14 may operate concurrently with the process (RA) depicted in FIG. 10. At step 262, the recipient device may wait until the current time is greater or equal to R.nextRequestPhase for some R in activeXferFiles. At step 264, the recipient device may (once the wait period at step 262 has elapsed) update fields of R as follows. R.nextRequestPhase may be set to the current time plus the constant kXFER_REQUEST_PHASE_RECEIVER_WAIT; R.emptyChunkRounds may be set either to 0, if R.gotAChunk is true, or mays be set to one greater than its previous value (i.e. incremented) otherwise; and in any case R.gotAChunk may be set to false. At step 266, the recipient device may determine if R.emptyChunkRounds is greater than kXFER_MAX_EMPTY_CHUNK_ROUNDS. If it is determined, at step 266, that R.emptyChunkRounds is not greater than kXFER_MAX_EMPTY_CHUNK_ROUNDS (test failed), the recipient device, at step 268, may determine if R.phase1 is true. If it is determined, at step 268, that R.phase1 is true (test passed), the recipient device, at step 270, may perform process RBA. Process RBA is depicted in FIG. 15. Upon performance of the process RBA, the process depicted in FIG. 14 may proceed to step 272. If it determined, at step 268, that R.phase1 is not true (test failed), the recipient device, at step 272, may determine if R.missingChunks is empty. If it is determined, at step 272, that R.missingChunks is empty (test passed), the recipient device, at step 274, may conclude file transfer successfully by closing R.Tmp, renaming R.Tmp to the filename R.filename and removing R from activeXferFiles and enter it into doneXferFiles. If it is determined, at step 266, that R.emptyChunkRounds is greater than kXFER_MAX_EMPTY_CHUNK_ROUNDS (test passed), the recipient device, at step 276, may conclude file transfer unsuccessfully by closing R.Tmp and deleting R.Tmp, removing R from activeXferFiles, and entering R into doneXferFiles. If it is determined, at step 272, that R.missingChunks is not empty (test failed), the recipient device, at step 278, may determine if the size of the R.missingChunks set is greater than the constant kXFER_MAXIMUM_CHUNKS_MISSED. If it is determined, at step 278, that the size of the R.missingChunks set is greater than the constant kXFER_MAXIMUM_CHUNKS_MISSED (test passed), the process may proceed to step 276 and continue therefrom. If it is determined, at step 278, that the size of the R.missingChunks set is not greater than the constant kXFER_MAXIMUM_CHUNKS_MISSED (test failed), the process may proceed to process RBB at step 280. The process RBB is depicted in FIG. 16.

FIG. 15 is another flow diagram of an example process for geocast-based file transfer implemented by a receiving device. FIG. 15 depicts the process RBA depicted in FIG. 14. At step 282, the recipient device may determine if the size of the R.receivedChunks set is greater than 0. If it is determined, at step 282, that the size of the R.receivedChunks set is greater than 0 (test passed), the recipient device, at step 284, may set a new variable C to be the lowest-numbered chunk record in R.receivedChunks, and may remove C from it. At step 288, the recipient device may determine if R.greatestChunkWritten is less than (chunk number in C)-1. If it is determined, at step 288, that R.greatestChunkWritten is not less than (chunk number in C)-1 (test failed), the recipient device, at step 286, may write out the bytes of C to R.Tmp. If it is determined, at step 288, that R.greatestChunkWritten is less than (chunk number in C)-1 (test passed), the recipient device, at step 290 may write out an all-zeroes chunk to R.Tmp; may add R.greatestChunkWritten to R.missingChunks; and may increment R.greatestChunkWritten by one; and may add R.greatestChunkWritten to R.missingChunks. If it is determined, at step 282, that the R.receivedChunks set is not greater than 0 (test failed), the recipient device, at step 292, may determine if R.greatestChunkWritten is less than R.numberOfChunks-1. If it is determined, at step 292, that R.greatestChunkWritten is not less than R.numberOfChunks-1 (test failed), the recipient device, at step 294, may set R.phase1 to false. If it is determined, at step 292, that R.greatestChunkWritten is less than R.numberOfChunks-1 (test passed), the recipient device, at step 296, may write out an all-zeroes chunk to R.Tmp; may increment R.greatestChunkWritten by one; and may add R.greatestChunkWritten to R.missingChunks. From step 296 the process may proceed to step 292 and continuer therefrom.

Figure 16:
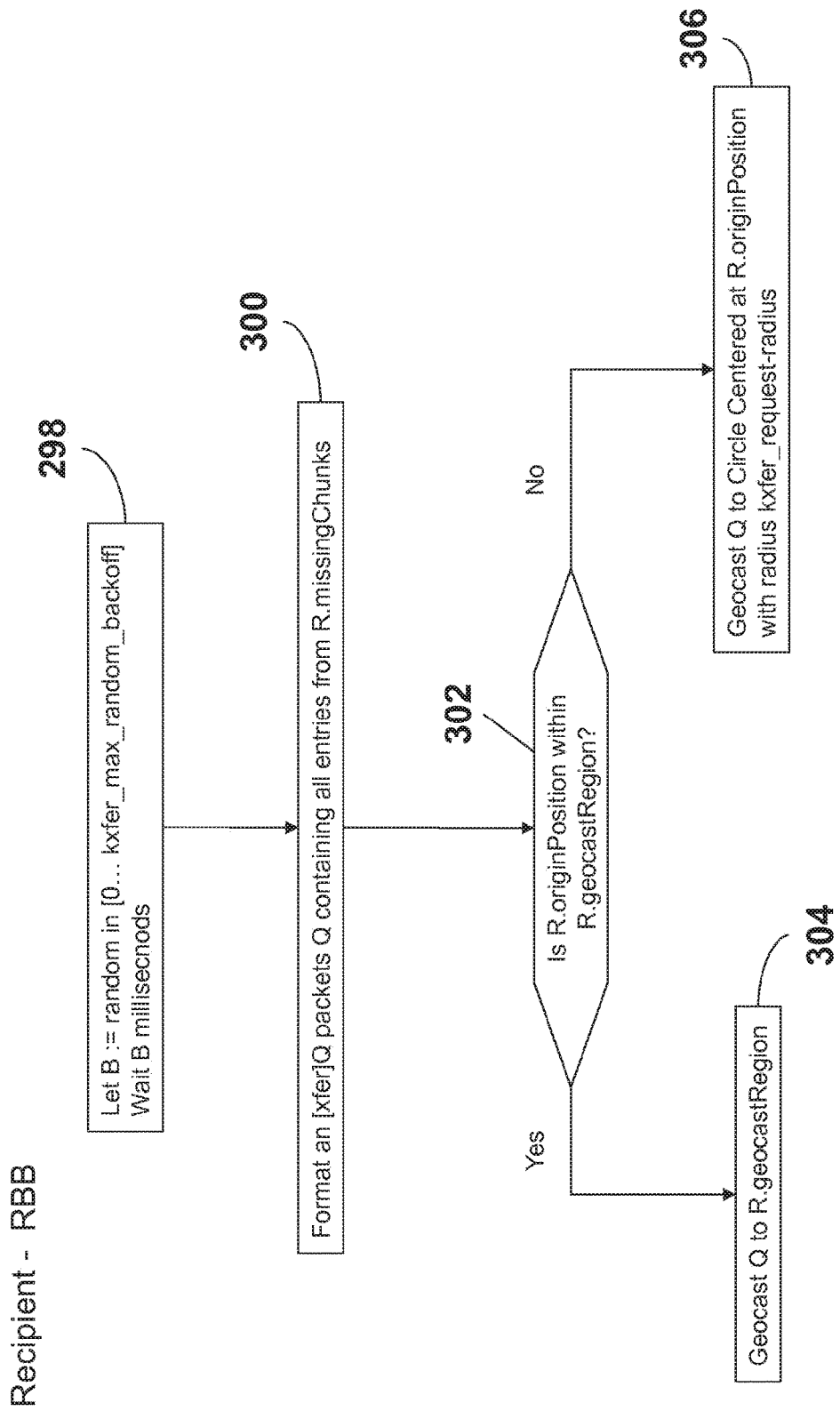
FIG. 16 is another flow diagram of an example process for geocast-based file transfer implemented by a receiving device.

FIG. 16 is another flow diagram of an example process for geocast-based file transfer implemented by a receiving device. FIG. 16 depicts the process RBB depicted in FIG. 14. At step 298, the recipient device may select a random integer between 0 and kXFER_MAX_RANDOM_BACKOFF and waits that many milliseconds before proceeding. At step 300, the recipient device, upon waiting the amount of time determined at step 298, may format an [Xfer]Q packet Q containing entries from R.missingChunks. At step 302, the recipient device may determine if R.originPosition lies within R.geocastRegion. If it is determined, at step 302, that R.originPosition lies within R.geocastRegion (test passed), the recipient device, at step 304, may geocast Q to R.geocastRegion. If it is determined, at step 302, that R.originPosition does not lie within R.geocastRegion (test failed), the recipient device, at step 306 may geocast Q to a circle centered at R.originPosition and with radius kXFER_REQUEST_RADIUS.

Values of variables and/or constants depicted in FIG. 5 through FIG. 16 may comprise any appropriate values or values. For example, kXFER_WAIT_TIME may be 100 msec, kMAX_EMPTY_REQUEST_ROUNDS may be 4, kXFER_REQUEST_PHASE_SENDER_WAIT may be 2000 msec, kXFER_REQUEST_PHASE_ RECEIVER_WAIT may be 3000 msec, kDONE_FILE_RE- TAIN_TIME may be 60000 msec, kXFER_MAX_CHUNK- S_IN_MEMORY may be 120, kXFER_MAX_EMPTY_C- HUNK_ROUNDS may be 4, kXFER_MAXIMUM_CHUNKS_MISSED may be 120, kXFER_MAX_RANDOM_BACKOFF may be 1000 msec, and kXFER_REQUEST_RADIUS may be 100 meters. It is to be understood that these values are merely examples and values should not be limited thereto.

Formats for messages may comprise any appropriate format. For example a format for the [Xfer]H message may be as follows.

```
[Xfer]H -- file chunk
// payload length:
//   6 + 1 + 4 + 4 + 2 + <length-of-file-name> + 4 + 2 + 4 + <chunkLength>
// [Xfer]H<seqNum><number_of_bytes><length_of_file_name><fileNameBytes>
//       <chunkNum><chunkLength><checksums[4]><chunkBytes>
// Note: origID for file is geocast origin ID
// Sent by sender of file to recipient geocast region
// Fields:
    "[Xfer]H"         // geocast tag. Must be accepted in all case mixes
    <seqNum> (4)      // file sequence number assigned by file-sender
    <number_of_bytes> (4) // #bytes in file; can be -1 for delete-this-file
    <length_of_file_name> (2) // number of bytes in file name
    <fileNameBytes> // <length-of-file-name> bytes file name
    <nextRequestPhase> (4) // msec from [this pkt orig. time] until
        // start of next request phase
    <chunkNum> (4)    // sequence number of this chunk within file
    <chunkLength> (2) // length of this chunk in bytes
    <checkSums> (4)   // 4 1-byte checksums (see spec)
    <chunkContents>   // chunk-length bytes; contents of this chunk of file
```

And an example format for the [Xfer]Q message may be as follows.

```
[Xfer]Q -- resend request
// [Xfer]Q<origID><seqNum><number_of_requests><chunkNum><chunkNum>...
// payload length: 6 + 1 + 4 + 4 + 4 + 4*<number_of_requests>
// Note: origID for file is now within payload (!= geocast origin ID)
// Sent by a file-recipient after missing one or more chunks
// Fields:
    "[Xfer]Q"         // geocast tag. Must be accepted in all case mixes
    <origID> (4)      // originID of file-sender
    <seqNum> (4)      // file sequence number assigned by file-sender
    <number_of_requests> (4) // number of chunks being requested here
    <chunkNum> (4)    // number of one requested chunk
    <chunkNum> (4)    // number of another requested chunk
    ... (as many as <number_of_requests>) ...
```

It is to be understood that these formats are merely examples and formats should not be limited thereto.

Figure 17:
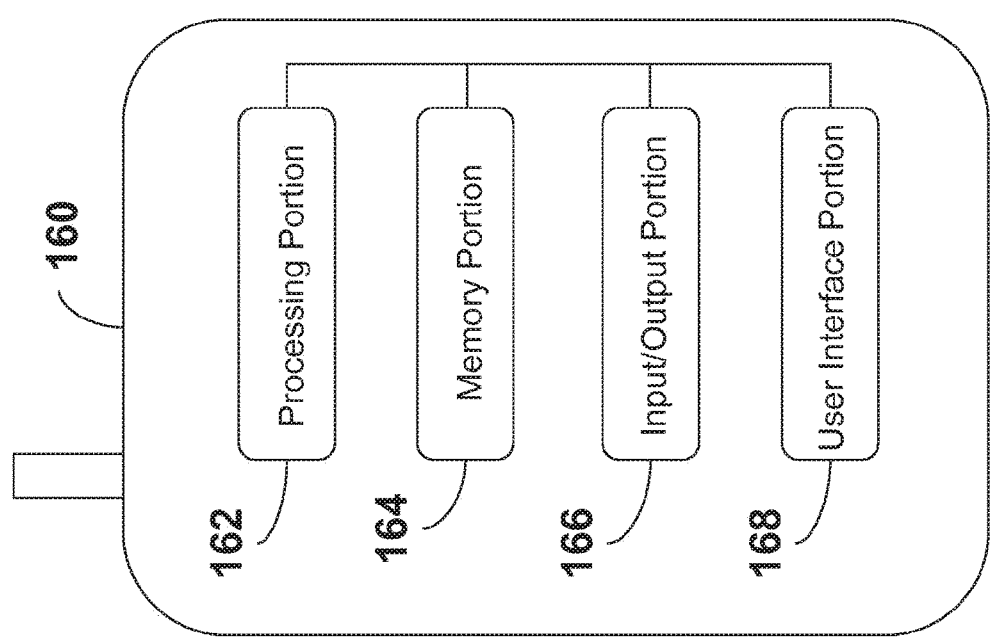
FIG. 17 is a block diagram of an example communications device (also referred to as a node) 160 configured to facilitate geocast-based file transfer.

FIG. 17 is a block diagram of an example communications device (also referred to as a node) 160 configured to facilitate geocast-based file transfer. In an example configuration, communications device 160 comprises a mobile wireless device. The communications device 160, however, may com-rise any appropriate device, examples of which include a portable computing device, such as a laptop, a personal digital assistant ("PDA"), a portable phone (e.g., a cell phone or the like, a smart phone, a video phone), a portable email device, a portable gaming device, a TV, a DVD player, portable media player, (e.g., a portable music player, such as an MP3 player, a Walkman, etc.), a portable navigation device (e.g., GPS compatible device, A-GPS compatible device, etc.), or a combination thereof. The communications device 160 can include devices that are not typically thought of as portable, such as, for example, a public computing device, a navigation device installed in-vehicle, a set top box, or the like. The mobile communications device 160 may include non-conventional computing devices, such as, for example, a kitchen appliance, a motor vehicle control (e.g., steering wheel), etc., or the like. As evident from the herein description, a node, and thus a communications device, is not to be construed as software per se.

The communications device 160 may include any appropriate device, mechanism, software, and/or hardware for facilitating geocast based file transfer as described herein. In an example embodiment, the ability to facilitate geocast based file transfer is a feature of the communications device 160 that may be turned on and off. Thus, in an example embodiment, an owner of the communications device 160 may opt-in or opt-out of this capability.

In an example embodiment, the communications device 160 may comprise a processor and memory coupled to the processor. The memory may comprise executable instructions that when executed by the processor cause the processor to effectuate operations associated with geocast based file transfer.

In an example configuration, the communications device 160 may comprise a processing portion 162, a memory portion 164, an input/output portion 166, and a user interface (UI) portion 168. Each portion of the mobile communications device 160 may comprise circuitry for performing functions associated with each respective portion. Thus, each portion may comprise hardware, or a combination of hardware and software, and thus is not to be construed as software per se. It is emphasized that the block diagram depiction of communications device 160 is exemplary and not intended to imply a specific implementation and/or configuration. For example, in an example configuration, the communications device 160 may comprise a cellular phone and the processing portion 162 and/or the memory portion 164 may be implemented, in part or in total, on a subscriber identity module (SIM) of the mobile communications device 160. In another example configuration, the communications device 160 may comprise a laptop computer. The laptop computer can include a SIM, and various portions of the processing portion 162 and/or the memory portion 164 can be implemented on the SIM, on the laptop other than the SIM, or any combination thereof.

The processing portion 162, memory portion 164, and input/output portion 166 may be coupled together to allow communications therebetween. In various embodiments, the input/output portion 166 may comprise a receiver of the communications device 160, a transmitter of the communications device 160, or a combination thereof. The input/output portion 166 may be capable of receiving and/or providing information pertaining to geocast based file transfer as described herein. In various configurations, the input/output portion 166 may receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), or a combination thereof.

The processing portion 162 may be capable of performing functions pertaining to geocast based file transfer as described herein. In a basic configuration, the communications device 160 may include at least one memory portion 164. The memory portion 164 may comprise a storage medium having a tangible physical structure. Thus, the memory portion 164 is not to be construed as a transient signal per se. Further, the memory portion 164 is not to be construed as a propagating signal per se. The memory portion 164 may store any information utilized in conjunction with geocast based file transfer as described herein. Depending upon the exact configuration and type of processor, the memory portion 164 may be volatile (such as some types of RAM), non-volatile (such as ROM, flash memory, etc.), or a combination thereof. The mobile communications device 160 may include additional storage (e.g., removable storage and/or non-removable storage) including, but not limited to, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or any other medium which can be used to store information and which can be accessed by the mobile communications device 160.

The communications device 160 also may contain a user interface (UI) portion 168 allowing a user to communicate with the communications device 160. The UI portion 168 may be capable of rendering any information utilized in conjunction with the geographic based file transfers and the GFT protocol as described herein. The UI portion 168 may provide the ability to control the communications device 160, via, for example, buttons, soft keys, voice actuated controls, a touch screen, movement of the mobile communications device 160, visual cues (e.g., moving a hand in front of a camera on the mobile communications device 160), or the like. The UI portion 168 may provide visual information (e.g., via a display), audio information (e.g., via speaker), mechanically (e.g., via a vibrating mechanism), or a combination thereof. In various configurations, the UI portion 168 may comprise a display, a touch screen, a keyboard, an accelerometer, a motion detector, a speaker, a microphone, a camera, a tilt sensor, or any combination thereof. The UI portion 168 may comprise means for inputting biometric information, such as, for example, fingerprint information, retinal information, voice information, and/or facial characteristic information.

The UI portion 168 may include a display for displaying multimedia such as, for example, application graphical user interfaces (GUIs), text, images, video, telephony functions such as Caller ID data, setup functions, menus, music, metadata, messages, wallpaper, graphics, Internet content, device status, preferences settings, map and location data, routes and other directions, points of interest (POI), and the like.

In some embodiments, the UI portion may comprise a user interface (UI) application. The UI application may interface with a client or operating system (OS) to, for example, facilitate user interaction with device functionality and data. The UI application may aid a user in entering message content, viewing received messages, answering/initiating calls, entering/deleting data, entering and setting user IDs and passwords, configuring settings, manipulating address book content and/or settings, interacting with other applications, or the like, and may aid the user in inputting selections and maneuvers associated with geocast based file transfer as described herein.

Although not necessary to facilitate the use and/or implementation of geocast based file transfer and the GFT protocol, a communications device can be part of and/or in communications with various wireless communications networks. Some of which are described below.

Figure 18:
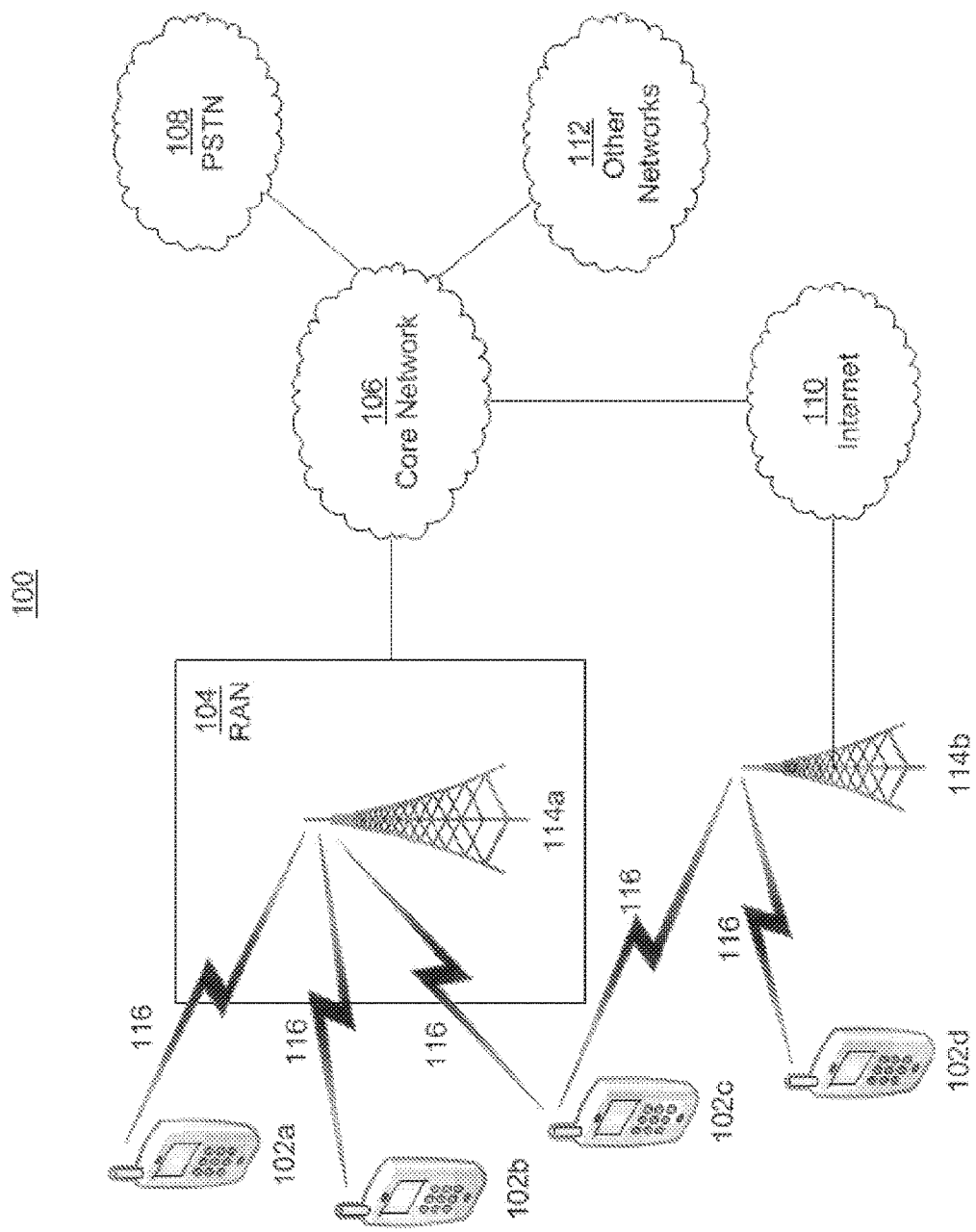
FIG. 18 is a diagram of an example communications system in which in which geocast-based file transfer may be implemented.

FIG. 18 is a diagram of an example communications system in which in which geocast-based file transfer may be implemented. The communications system 100 may comprise a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. A communications system such as that shown in FIG. 18 may also be referred to herein as a network.

As shown in FIG. 18, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. For example, a WTRU may comprise intended recipient(s) 32, communications device 80, or the like, or any combination thereof. By way of example, the WTRUs 102a, 102b, 102c, 102d may be configured to transmit and/or receive wireless signals and may include user equipment (UE), a mobile station, a mobile device, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA) that may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 18 may comprise a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 18, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 18, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 18 may be configured to communicate with the base station 114a, which may employ a cellular-based radio technology, and with the base station 114b, which may employ an IEEE 802 radio technology.

Figure 19:
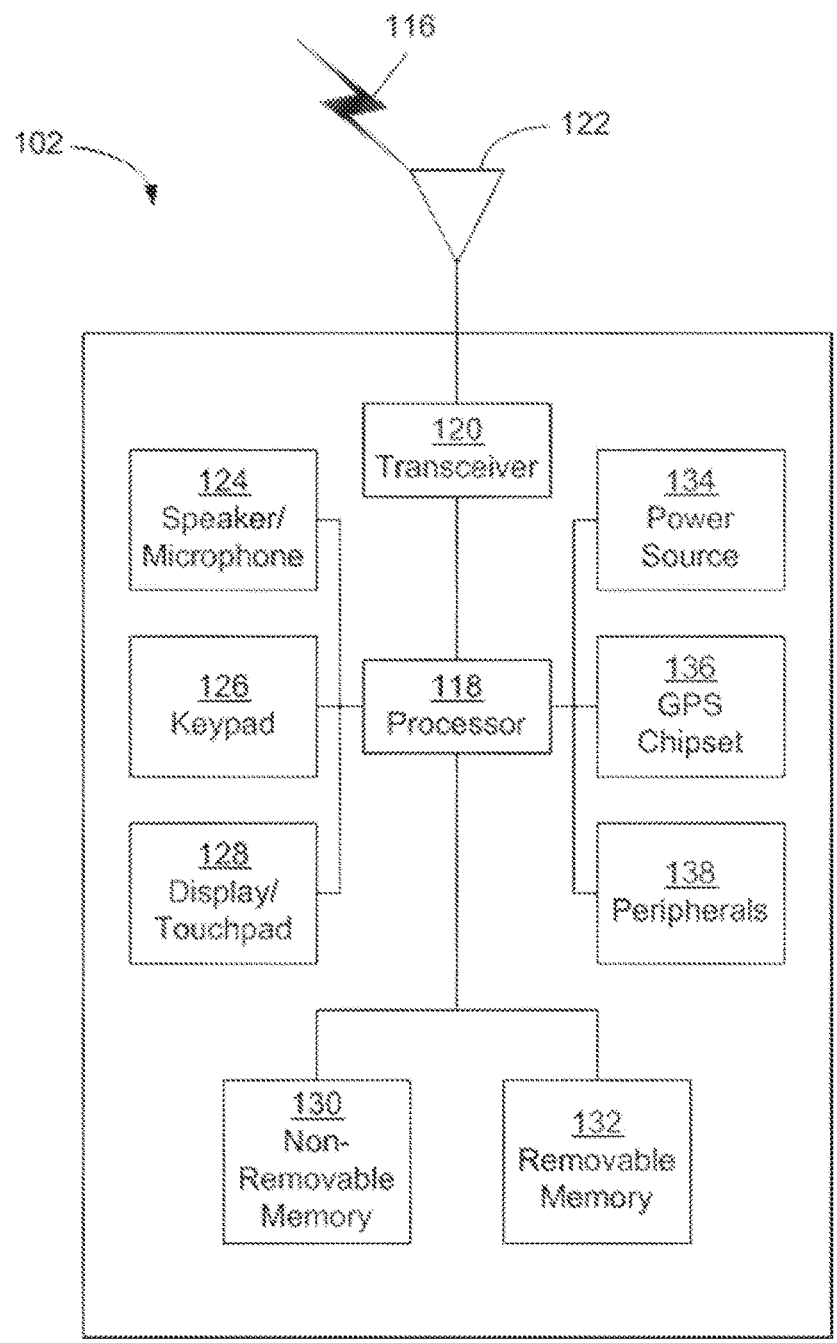
FIG. 19 is a system diagram of an example WTRU 102.

FIG. 19 is a system diagram of an example WTRU 102. As shown in FIG. 19, the WTRU 102 may include a processor 118, a transceiver 120, a transmit/receive element 122, a speaker/microphone 124, a keypad 126, a display/ touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. For example, the WTRU 102 may comprise a node, a mobile device, the communications device 160, or the like, or any appropriate combination thereof.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 19 depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 19 as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 20:
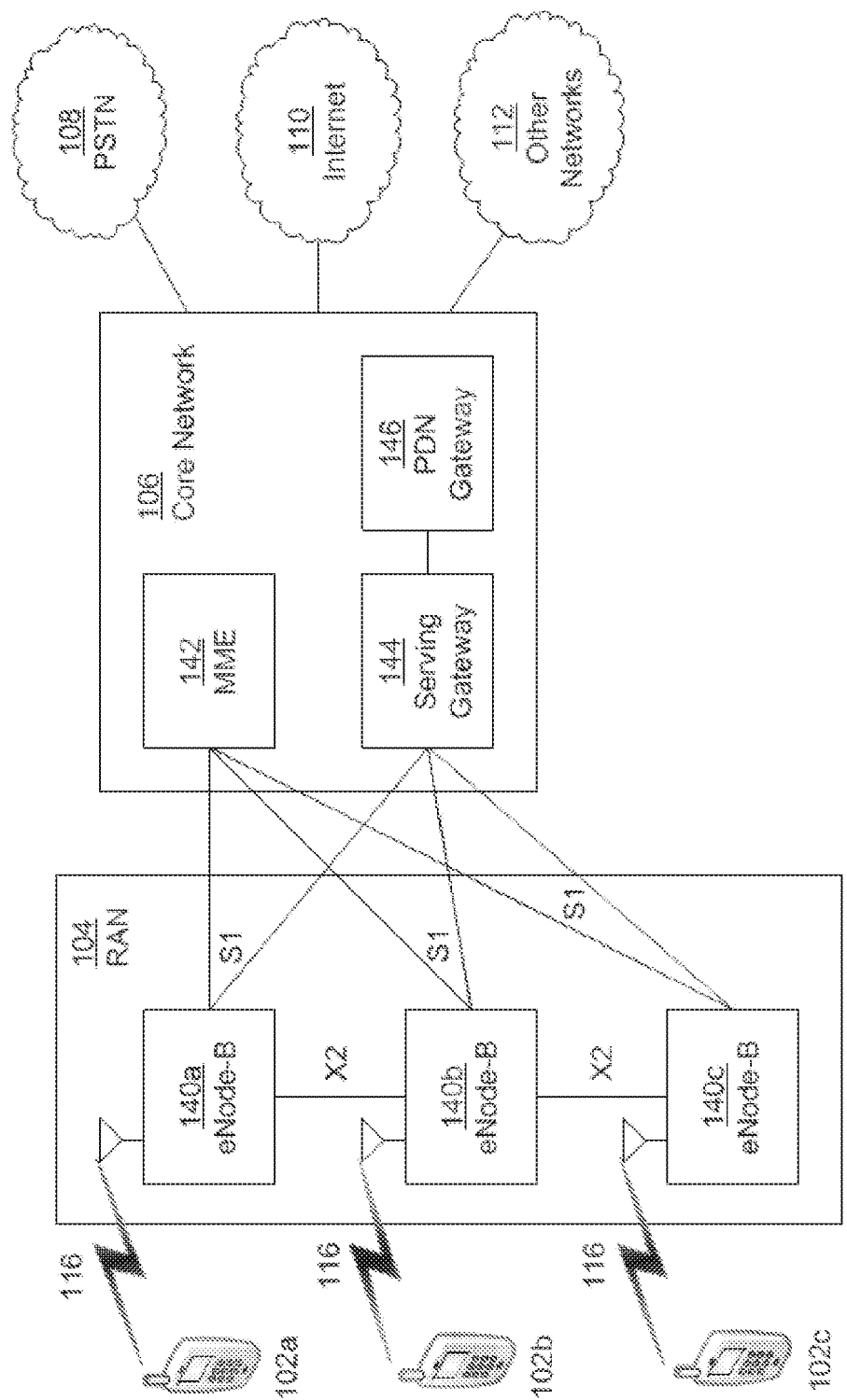
FIG. 20 is an example system diagram of RAN and core network.

FIG. 20 is an example system diagram of RAN 104 and core network 106. As noted above, the RAN 104 may employ an E-UTRA radio technology to communicate with the WTRUs 102a, 102b, and 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, and 140c may be associated with a particular cell (not shown) and may be configured to handle radio resource management decisions, handover decisions, scheduling of users in the uplink and/or downlink, and the like. As shown in FIG. 20, the eNode-Bs 140a, 140b, 140c may communicate with one another over an X2 interface.

The core network 106 shown in FIG. 20 may include a mobility management gateway or entity (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an Si interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode-Bs 140a, 140b, and 140c in the RAN 104 via the Si interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 21:
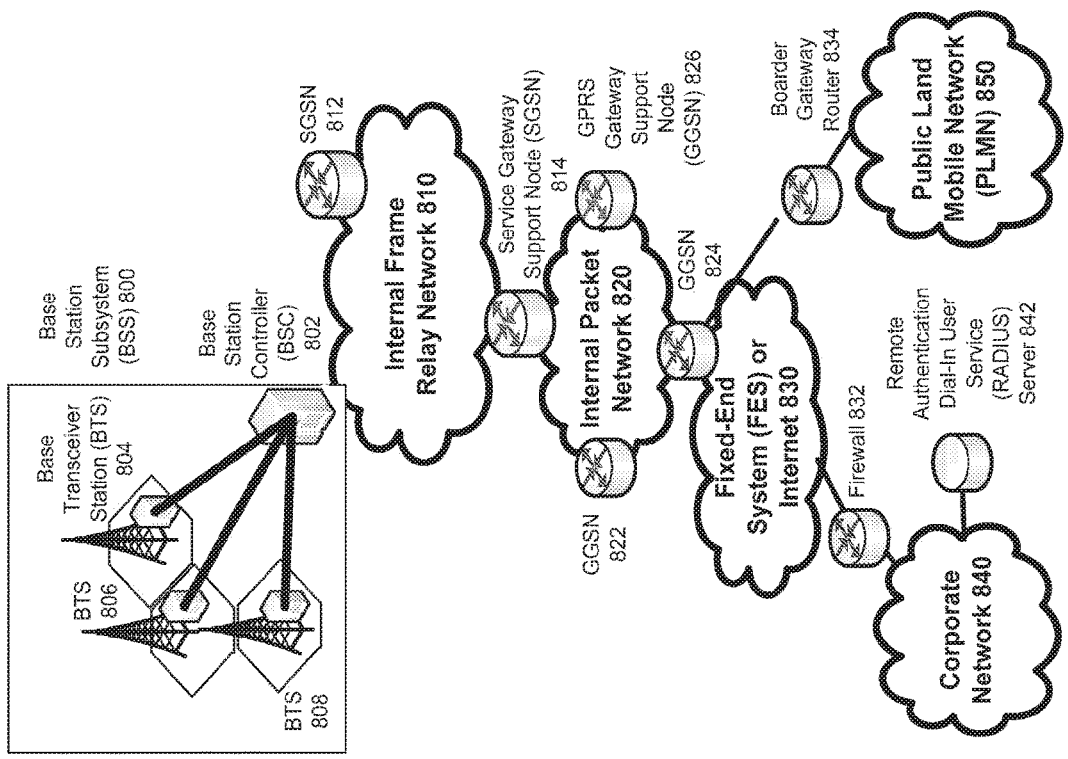
FIG. 21 depicts an overall block diagram of an example packet-based mobile cellular network environment, such as a GPRS network, within which the geocast-based file transfer may be implemented.

FIG. 21 depicts an overall block diagram of an example packet-based mobile cellular network environment, such as a GPRS network, within which the geocast-based file transfer may be implemented. In the example packet-based mobile cellular network environment shown in FIG. 21, there are a plurality of Base Station Subsystems ("BSS") 800 (only one is shown), each of which comprises a Base Station Controller ("BSC") 802 serving a plurality of Base Transceiver Stations ("BTS") such as BTSs 804, 806, and 808. BTSs 804, 806, 808, etc. are the access points where users of packet-based mobile devices become connected to the wireless network. In example fashion, the packet traffic originating from user devices is transported via an over-the-air interface to a BTS 808, and from the BTS 808 to the BSC 802. Base station subsystems, such as BSS 800, are a part of internal frame relay network 810 that can include Service GPRS Support Nodes ("SGSN") such as SGSN 812 and 814. Each SGSN is connected to an internal packet network 820 through which a SGSN 812, 814, etc. can route data packets to and from a plurality of gateway GPRS support nodes (GGSN) 822, 824, 826, etc. As illustrated, SGSN 814 and GGSNs 822, 824, and 826 are part of internal packet network 820. Gateway GPRS serving nodes 822, 824 and 826 mainly provide an interface to external Internet Protocol ("IP") networks such as Public Land Mobile Network ("PLMN") 850, corporate intranets 840, or Fixed-End System ("FES") or the public Internet 830. As illustrated, subscriber corporate network 840 may be connected to GGSN 824 via firewall 832; and PLMN 850 is connected to GGSN 824 via boarder gateway router 834. The Remote Authentication Dial-In User Service ("RADIUS") server 842 may be used for caller authentication when a user of a mobile cellular device calls corporate network 840.

Generally, there can be a several cell sizes in a GSM network, referred to as macro, micro, pico, femto and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. Femto cells have the same size as pico cells, but a smaller transport capacity. Femto cells are used indoors, in residential, or small business environments. On the other hand, umbrella cells are used to cover shadowed regions of smaller cells and fill in gaps in coverage between those cells.

Figure 22:
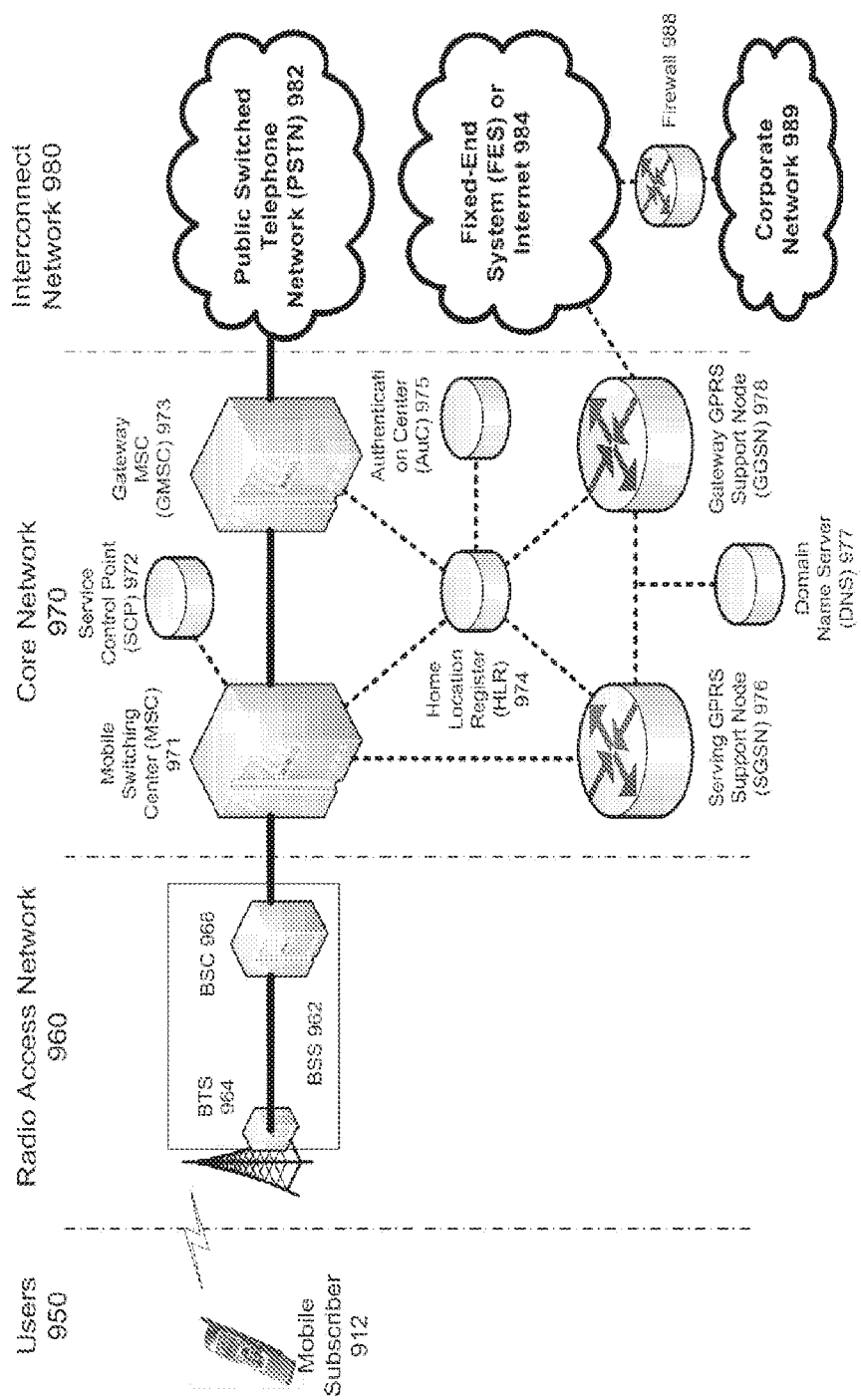
FIG. 22 illustrates an architecture of a typical GPRS network within which geocast-based file transfer may be implemented.

FIG. 22 illustrates an architecture of a typical GPRS network within which geocast-based file transfer may be implemented. The architecture depicted in FIG. 22 is segmented into four groups: users 950, radio access network 960, core network 970, and interconnect network 980. Users 950 comprise a plurality of end users. Note, device 912 is referred to as a mobile subscriber in the description of network shown in FIG. 22. In an example embodiment, the device depicted as mobile subscriber 912 comprises a communications device (e.g., communications device 160). Radio access network 960 comprises a plurality of base station subsystems such as BSSs 962, which include BTSs 964 and BSCs 966. Core network 970 comprises a host of various network elements. As illustrated in FIG. 22, core network 970 may comprise Mobile Switching Center ("MSC") 971, Service Control Point ("SCP") 972, gateway MSC 973, SGSN 976, Home Location Register ("HLR") 974, Authentication Center ("AuC") 975, Domain Name Server ("DNS") 977, and GGSN 978. Interconnect network 980 also comprises a host of various networks and other network elements. As illustrated in FIG. 22, interconnect network 980 comprises Public Switched Telephone Network ("PSTN") 982, Fixed-End System ("FES") or Internet 984, firewall 988, and Corporate Network 989.

A mobile switching center can be connected to a large number of base station controllers. At MSC 971, for instance, depending on the type of traffic, the traffic may be separated in that voice may be sent to Public Switched Telephone Network ("PSTN") 982 through Gateway MSC ("GMSC") 973, and/or data may be sent to SGSN 976, which then sends the data traffic to GGSN 978 for further forwarding.

When MSC 971 receives call traffic, for example, from BSC 966, it sends a query to a database hosted by SCP 972. The SCP 972 processes the request and issues a response to MSC 971 so that it may continue call processing as appropriate.

The HLR 974 is a centralized database for users to register to the GPRS network. HLR 974 stores static information about the subscribers such as the International Mobile Subscriber Identity ("IMSI"), subscribed services, and a key for authenticating the subscriber. HLR 974 also stores dynamic subscriber information such as the current location of the mobile subscriber. Associated with HLR 974 is AuC 975. AuC 975 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 22, when mobile subscriber 912 initiates the attach process by turning on the network capabilities of the mobile device, an attach request is sent by mobile subscriber 912 to SGSN 976. The SGSN 976 queries another SGSN, to which mobile subscriber 912 was attached before, for the identity of mobile subscriber 912. Upon receiving the identity of mobile subscriber 912 from the other SGSN, SGSN 976 requests more information from mobile subscriber 912. This information is used to authenticate mobile subscriber 912 to SGSN 976 by HLR 974. Once verified, SGSN 976 sends a location update to HLR 974 indicating the change of location to a new SGSN, in this case SGSN 976. HLR 974 notifies the old SGSN, to which mobile subscriber 912 was attached before, to cancel the location process for mobile subscriber 912. HLR 974 then notifies SGSN 976 that the location update has been performed. At this time, SGSN 976 sends an Attach Accept message to mobile subscriber 912, which in turn sends an Attach Complete message to SGSN 976.

After attaching itself with the network, mobile subscriber 912 then goes through the authentication process. In the authentication process, SGSN 976 sends the authentication information to HLR 974, which sends information back to SGSN 976 based on the user profile that was part of the user's initial setup. The SGSN 976 then sends a request for authentication and ciphering to mobile subscriber 912. The mobile subscriber 912 uses an algorithm to send the user identification (ID) and password to SGSN 976. The SGSN 976 uses the same algorithm and compares the result. If a match occurs, SGSN 976 authenticates mobile subscriber 912.

Next, the mobile subscriber 912 establishes a user session with the destination network, corporate network 989, by going through a Packet Data Protocol ("PDP") activation process. Briefly, in the process, mobile subscriber 912 requests access to the Access Point Name ("APN"), for example, UPS.com, and SGSN 976 receives the activation request from mobile subscriber 912. SGSN 976 then initiates a Domain Name Service ("DNS") query to learn which GGSN node has access to the UPS.com APN. The DNS query is sent to the DNS server within the core network 970, such as DNS 977, which is provisioned to map to one or more GGSN nodes in the core network 970. Based on the APN, the mapped GGSN 978 can access the requested corporate network 989. The SGSN 976 then sends to GGSN 978 a Create Packet Data Protocol ("PDP") Context Request message that contains necessary information. The GGSN 978 sends a Create PDP Context Response message to SGSN 976, which then sends an Activate PDP Context Accept message to mobile subscriber 912.

Once activated, data packets of the call made by mobile subscriber 912 can then go through radio access network 960, core network 970, and interconnect network 980, in a particular fixed-end system or Internet 984 and firewall 988, to reach corporate network 989.

Figure 23:
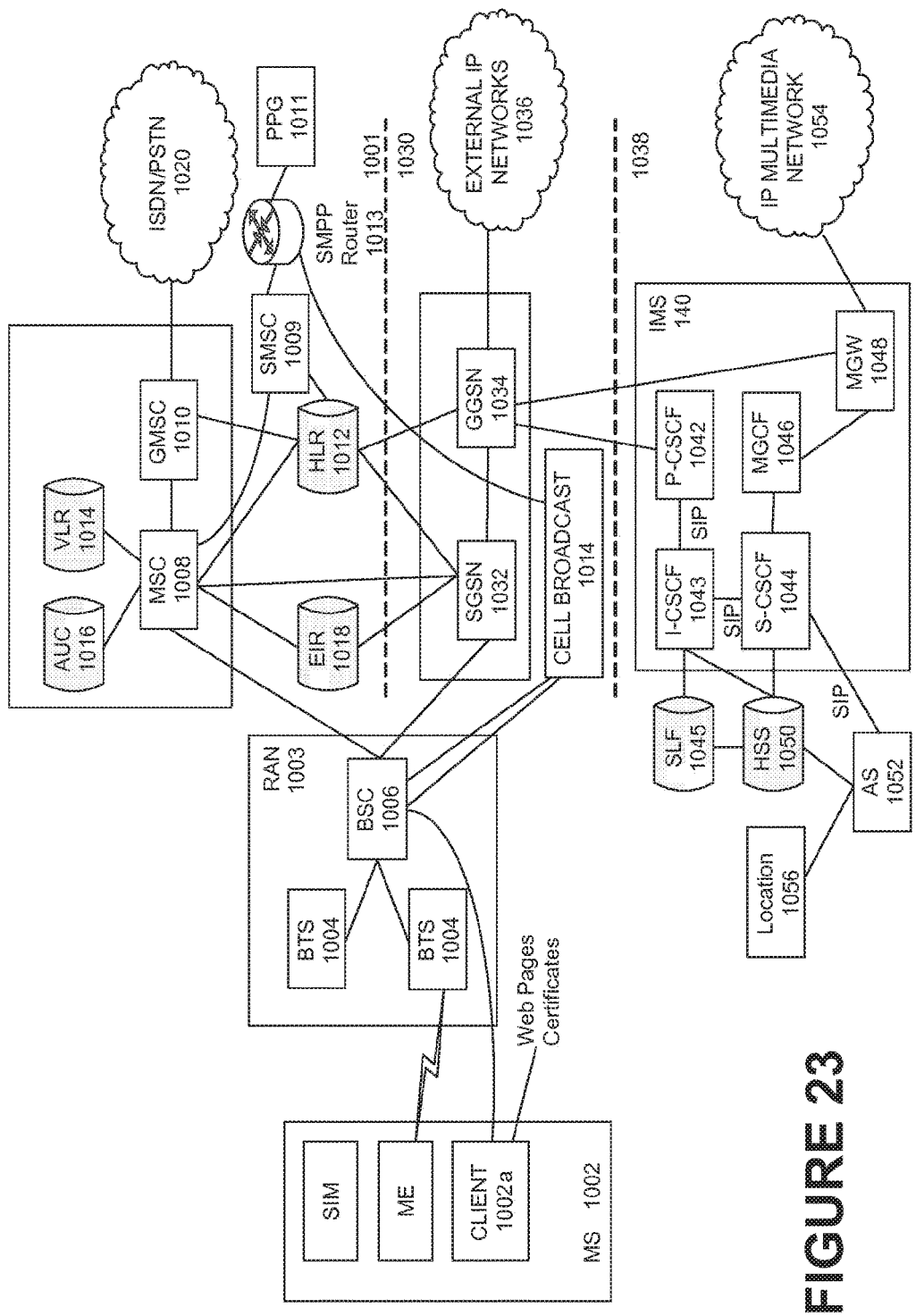
FIG. 23 illustrates an example block diagram view of a GSM/GPRS/IP multimedia network architecture within which geocast-based file transfer may be implemented.

FIG. 23 illustrates an example block diagram view of a GSM/GPRS/IP multimedia network architecture within which geocast-based file transfer may be implemented. As illustrated, the architecture of FIG. 23 includes a GSM core network 1001, a GPRS network 1030 and an IP multimedia network 1038. The GSM core network 1001 includes a Mobile Station (MS) 1002, at least one Base Transceiver Station (BTS) 1004 and a Base Station Controller (BSC) 1006. The MS 1002 is physical equipment or Mobile Equipment (ME), such as a mobile phone or a laptop computer that is used by mobile subscribers, with a Subscriber identity Module (SIM) or a Universal Integrated Circuit Card (UICC). The SIM or UICC includes an International Mobile Subscriber Identity (IMSI), which is a unique identifier of a subscriber. The BTS 1004 is physical equipment, such as a radio tower, that enables a radio interface to communicate with the MS. Each BTS may serve more than one MS. The BSC 1006 manages radio resources, including the BTS. The BSC may be connected to several BTSs. The BSC and BTS components, in combination, are generally referred to as a base station (BSS) or radio access network (RAN) 1003.

The GSM core network 1001 also includes a Mobile Switching Center (MSC) 1008, a Gateway Mobile Switching Center (GMSC) 1010, a Home Location Register (HLR) 1012, Visitor Location Register (VLR) 1014, an Authentication Center (AuC) 1018, and an Equipment Identity Register (EIR) 1016. The MSC 1008 performs a switching function for the network. The MSC also performs other functions, such as registration, authentication, location updating, handovers, and call routing. The GMSC 1010 provides a gateway between the GSM network and other networks, such as an Integrated Services Digital Network (ISDN) or Public Switched Telephone Networks (PSTNs) 1020. Thus, the GMSC 1010 provides interworking functionality with external networks.

The HLR 1012 is a database that contains administrative information regarding each subscriber registered in a corresponding GSM network. The HLR 1012 also contains the current location of each MS. The VLR 1014 is a database that contains selected administrative information from the HLR 1012. The VLR contains information necessary for call control and provision of subscribed services for each MS currently located in a geographical area controlled by the VLR. The HLR 1012 and the VLR 1014, together with the MSC 1008, provide the call routing and roaming capabilities of GSM. The AuC 1016 provides the parameters needed for authentication and encryption functions. Such parameters allow verification of a subscriber's identity. The EIR 1018 stores security-sensitive information about the mobile equipment.

A Short Message Service Center (SMSC) 1009 allows one-to-one Short Message Service (SMS) messages to be sent to/from the MS 1002. A Push Proxy Gateway (PPG) 1011 is used to "push" (i.e., send without a synchronous request) content to the MS 1002. The PPG 1011 acts as a proxy between wired and wireless networks to facilitate pushing of data to the MS 1002. A Short Message Peer to Peer (SMPP) protocol router 1013 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1002 sends a location update including its current location information to the MSC/VLR, via the BTS 1004 and the BSC 1006. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 1030 is logically implemented on the GSM core network architecture by introducing two packet-switching network nodes, a serving GPRS support node (SGSN) 1032, a cell broadcast and a Gateway GPRS support node (GGSN) 1034. The SGSN 1032 is at the same hierarchical level as the MSC 1008 in the GSM network. The SGSN controls the connection between the GPRS network and the MS 1002. The SGSN also keeps track of individual MS's locations and security functions and access controls.

A Cell Broadcast Center (CBC) 14 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1034 provides a gateway between the GPRS network and a public packet network (PDN) or other IP networks 1036. That is, the GGSN provides interworking functionality with external networks, and sets up a logical link to the MS through the SGSN. When packet-switched data leaves the GPRS network, it is transferred to an external TCP-IP network 1036, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one of three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 1030 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not receive pages from a circuit switched domain when engaged in a data call, since the MS is receiving data and is not listening to a paging channel. In a NOM3 network, a MS can monitor pages for a circuit switched network while received data and vice versa.

The IP multimedia network 1038 was introduced with 3GPP Release 5, and includes an IP multimedia subsystem (IMS) 1040 to provide rich multimedia services to end users. A representative set of the network entities within the IMS 1040 are a call/session control function (CSCF), a media gateway control function (MGCF) 1046, a media gateway (MGW) 1048, and a master subscriber database, called a home subscriber server (HSS) 1050. The HSS 1050 may be common to the GSM network 1001, the GPRS network 1030 as well as the IP multimedia network 1038.

The IP multimedia system 1040 is built around the call/session control function, of which there are three types: an interrogating CSCF (I-CSCF) 1043, a proxy CSCF (P-CSCF) 1042, and a serving CSCF (S-CSCF) 1044. The P-CSCF 1042 is the MS's first point of contact with the IMS 1040. The P-CSCF 1042 forwards session initiation protocol (SIP) messages received from the MS to an SIP server in a home network (and vice versa) of the MS. The P-CSCF 1042 may also modify an outgoing request according to a set of rules defined by the network operator (for example, address analysis and potential modification).

The I-CSCF 1043, forms an entrance to a home network and hides the inner topology of the home network from other networks and provides flexibility for selecting an S-CSCF. The I-CSCF 1043 may contact a subscriber location function (SLF) 1045 to determine which HSS 1050 to use for the particular subscriber, if multiple HSS's 1050 are present. The S-CSCF 1044 performs the session control services for the MS 1002. This includes routing originating sessions to external networks and routing terminating sessions to visited networks. The S-CSCF 1044 also decides whether an application server (AS) 1052 is required to receive information on an incoming SIP session request to ensure appropriate service handling. This decision is based on information received from the HSS 1050 (or other sources, such as an application server 1052). The AS 1052 also communicates to a location server 1056 (e.g., a Gateway Mobile Location Center (GMLC)) that provides a position (e.g., latitude/longitude coordinates) of the MS 1002.

The HSS 1050 contains a subscriber profile and keeps track of which core network node is currently handling the subscriber. It also supports subscriber authentication and authorization functions (AAA). In networks with more than one HSS 1050, a subscriber location function provides information on the HSS 1050 that contains the profile of a given subscriber.

The MGCF 1046 provides interworking functionality between SIP session control signaling from the IMS 1040 and ISUP/BICC call control signaling from the external GSTN networks (not shown). It also controls the media gateway (MGW) 1048 that provides user-plane interworking functionality (e.g., converting between AMR- and PCM-coded voice). The MGW 1048 also communicates with other IP multimedia networks 1054.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

Figure 24:
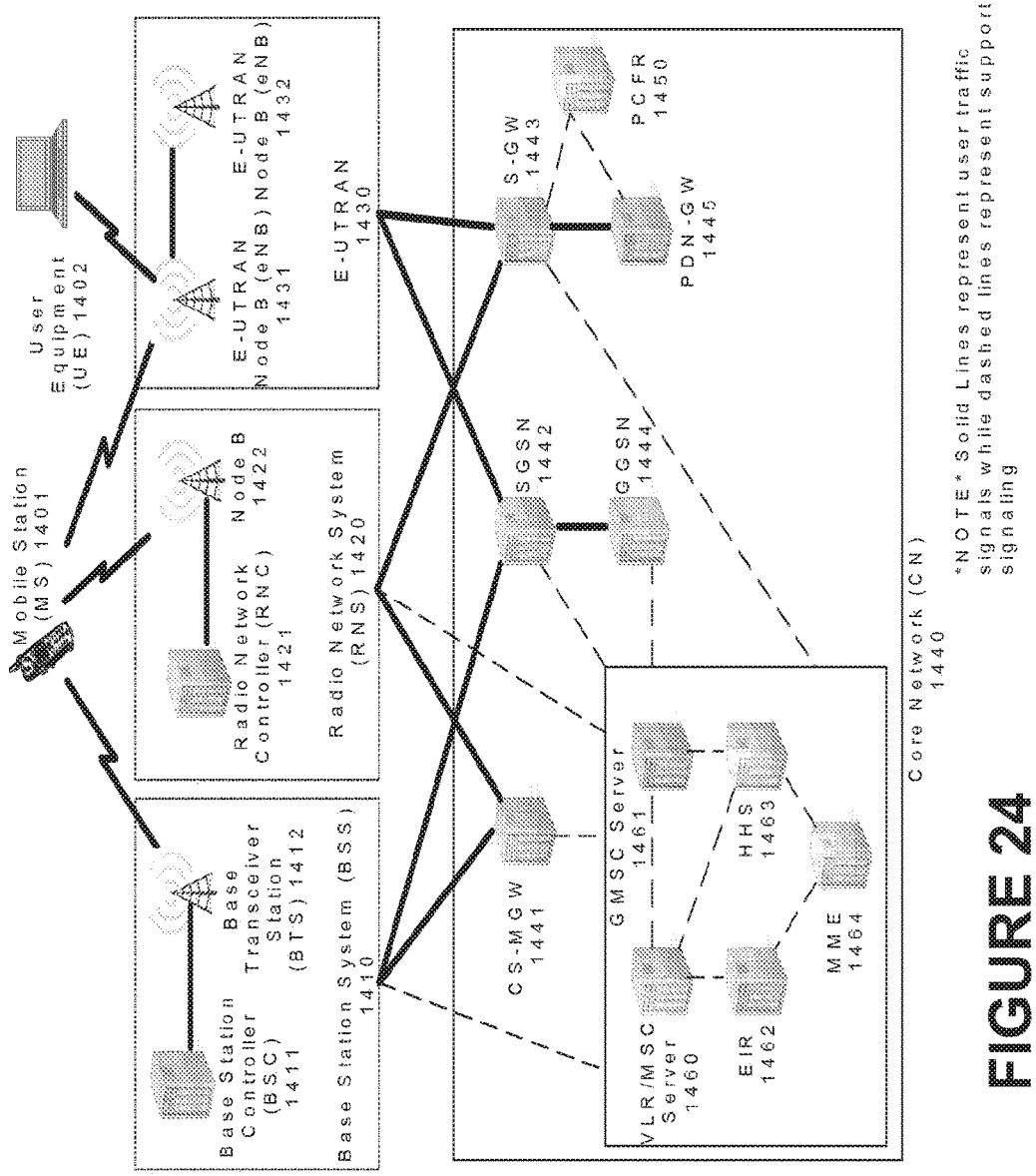
FIG. 24 illustrates a PLMN block diagram view of an example architecture in which geocast-based file transfer may be incorporated.

FIG. 24 illustrates a PLMN block diagram view of an example architecture in which geocast-based file transfer may be incorporated. Mobile Station (MS) 1401 is the physical equipment used by the PLMN subscriber. In one illustrative embodiment, communications device 200 may serve as Mobile Station 1401. Mobile Station 1401 may be one of, but not limited to, a cellular telephone, a cellular telephone in combination with another electronic device or any other wireless mobile communication device.

Mobile Station 1401 may communicate wirelessly with Base Station System (BSS) 1410. BSS 1410 contains a Base Station Controller (BSC) 1411 and a Base Transceiver Station (BTS) 1412. BSS 1410 may include a single BSC 1411/BTS 1412 pair (Base Station) or a system of BSC/BTS pairs which are part of a larger network. BSS 1410 is responsible for communicating with Mobile Station 1401 and may support one or more cells. BSS 1410 is responsible for handling cellular traffic and signaling between Mobile Station 1401 and Core Network 1440. Typically, BSS 1410 performs functions that include, but are not limited to, digital conversion of speech channels, allocation of channels to mobile devices, paging, and transmission/reception of cellular signals.

Additionally, Mobile Station 1401 may communicate wirelessly with Radio Network System (RNS) 1420. RNS 1420 contains a Radio Network Controller (RNC) 1421 and one or more Node(s) B 1422. RNS 1420 may support one or more cells. RNS 1420 may also include one or more RNC 1421/Node B 1422 pairs or alternatively a single RNC 1421 may manage multiple Nodes B 1422. RNS 1420 is responsible for communicating with Mobile Station 1401 in its geographically defined area. RNC 1421 is responsible for controlling the Node(s) B 1422 that are connected to it and is a control element in a UMTS radio access network. RNC 1421 performs functions such as, but not limited to, load control, packet scheduling, handover control, security functions, as well as controlling Mobile Station 1401's access to the Core Network (CN) 1440.

The evolved UMTS Terrestrial Radio Access Network (E-UTRAN) 1430 is a radio access network that provides wireless data communications for Mobile Station 1401 and User Equipment 1402. E-UTRAN 1430 provides higher data rates than traditional UMTS. It is part of the Long Term Evolution (LTE) upgrade for mobile networks and later releases meet the requirements of the International Mobile Telecommunications (IMT) Advanced and are commonly known as a 4G networks. E-UTRAN 1430 may include of series of logical network components such as E-UTRAN Node B (eNB) 1431 and E-UTRAN Node B (eNB) 1432. E-UTRAN 1430 may contain one or more eNBs. User Equipment 1402 may be any user device capable of connecting to E-UTRAN 1430 including, but not limited to, a personal computer, laptop, mobile device, wireless router, or other device capable of wireless connectivity to E-UTRAN 1430. The improved performance of the E-UTRAN 1430 relative to a typical UMTS network allows for increased bandwidth, spectral efficiency, and functionality including, but not limited to, voice, high-speed applications, large data transfer and IPTV, while still allowing for full mobility.

An example embodiment of a mobile data and communication service that may be implemented in the PLMN architecture described in FIG. 24 is the Enhanced Data rates for GSM Evolution (EDGE). EDGE is an enhancement for GPRS networks that implements an improved signal modulation scheme known as 8-PSK (Phase Shift Keying). By increasing network utilization, EDGE may achieve up to three times faster data rates as compared to a typical GPRS network. EDGE may be implemented on any GSM network capable of hosting a GPRS network, making it an ideal upgrade over GPRS since it may provide increased functionality of existing network resources. Evolved EDGE networks are becoming standardized in later releases of the radio telecommunication standards, which provide for even greater efficiency and peak data rates of up to 1 Mbit/s, while still allowing implementation on existing GPRS-capable network infrastructure.

Typically Mobile Station 1401 may communicate with any or all of BSS 1410, RNS 1420, or E-UTRAN 1430. In a illustrative system, each of BSS 1410, RNS 1420, and E-UTRAN 1430 may provide Mobile Station 1401 with access to Core Network 1440. The Core Network 1440 may include of a series of devices that route data and communications between end users. Core Network 1440 may provide network service functions to users in the Circuit Switched (CS) domain, the Packet Switched (PS) domain or both. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The Circuit Switched-Media Gateway Function (CS-MGW) 1441 is part of Core Network 1440, and interacts with Visitor Location Register (VLR) and Mobile-Services Switching Center (MSC) Server 1460 and Gateway MSC Server 1461 in order to facilitate Core Network 1440 resource control in the CS domain. Functions of CS-MGW 1441 include, but are not limited to, media conversion, bearer control, payload processing and other mobile network processing such as handover or anchoring. CS-MGW 1440 may receive connections to Mobile Station 1401 through BSS 1410, RNS 1420 or both.

Serving GPRS Support Node (SGSN) 1442 stores subscriber data regarding Mobile Station 1401 in order to facilitate network functionality. SGSN 1442 may store subscription information such as, but not limited to, the International Mobile Subscriber Identity (IMSI), temporary identities, or Packet Data Protocol (PDP) addresses. SGSN 1442 may also store location information such as, but not limited to, the Gateway GPRS Support Node (GGSN) 1444 address for each GGSN where an active PDP exists. GGSN 1444 may implement a location register function to store subscriber data it receives from SGSN 1442 such as subscription or location information.

Serving Gateway (S-GW) 1443 is an interface which provides connectivity between E-UTRAN 1430 and Core Network 1440. Functions of S-GW 1443 include, but are not limited to, packet routing, packet forwarding, transport level packet processing, event reporting to Policy and Charging Rules Function (PCRF) 1450, and mobility anchoring for inter-network mobility. PCRF 1450 uses information gathered from S-GW 1443, as well as other sources, to make applicable policy and charging decisions related to data flows, network resources and other network administration functions. Packet Data Network Gateway (PDN-GW) 1445 may provide user-to-services connectivity functionality including, but not limited to, network-wide mobility anchoring, bearer session anchoring and control, and IP address allocation for PS domain connections.

Home Subscriber Server (HSS) 1463 is a database for user information, and stores subscription data regarding Mobile Station 1401 or User Equipment 1402 for handling calls or data sessions. Networks may contain one HSS 1463 or more if additional resources are required. Example data stored by HSS 1463 include, but is not limited to, user identification, numbering and addressing information, security information, or location information. HSS 1463 may also provide call or session establishment procedures in both the PS and CS domains.

The VLR/MSC Server 1460 provides user location functionality. When Mobile Station 1401 enters a new network location, it begins a registration procedure. A MSC Server for that location transfers the location information to the VLR for the area. A VLR and MSC Server may be located in the same computing environment, as is shown by VLR/MSC Server 1460, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for Mobile Station 1401 registration or procedures for handover of Mobile Station 1401 to a different section of the Core Network 1440. GMSC Server 1461 may serve as a connection to alternate GMSC Servers for other mobile stations in larger networks.

Equipment Identity Register (EIR) 1462 is a logical element which may store the International Mobile Equipment Identities (IMEI) for Mobile Station 1401. In a typical embodiment, user equipment may be classified as either "white listed" or "black listed" depending on its status in the network. In one embodiment, if Mobile Station 1401 is stolen and put to use by an unauthorized user, it may be registered as "black listed" in EIR 1462, preventing its use on the network. Mobility Management Entity (MME) 1464 is a control node which may track Mobile Station 1401 or User Equipment 1402 if the devices are idle. Additional functionality may include the ability of MME 1464 to contact an idle Mobile Station 1401 or User Equipment 1402 if retransmission of a previous session is required.

While example embodiments of geocast-base file transfer have been described in connection with various computing devices/processors, the underlying concepts may be applied to any computing device, processor, or system capable of implementing the GFT protocol. The various techniques described herein may be implemented in connection with hardware or software or, where appropriate, with a combination of both. Thus, the methods and apparatuses for using and implementing geocast-base file transfer may be implemented, or certain aspects or portions thereof, may take the form of program code (e.g., instructions) embodied in tangible storage media having a tangible physical structure. Examples of tangible storage media include floppy diskettes, CD-ROMs, DVDs, hard drives, or any other tangible machine-readable storage medium (computer-readable storage medium). Thus, a computer-readable storage medium is not a transient signal per se. Further, a computer-readable storage medium is not a propagating signal per se. When the program code is loaded into and executed by a machine, such as a computer, the machine becomes an apparatus for implementing geocast-based file transfer. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and apparatuses for using and implementing geocast-based file transfer also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for implementing geocast-based file transfer. When implemented on a general-purpose processor, the program code combines with the processor to provide a unique apparatus that operates to invoke the functionality of geocast-based file transfer.

While geocast-based file transfer has been described in connection with the various embodiments of the various figures, it is to be understood that other similar embodiments can be used or modifications and additions can be made to the described embodiments for implementing geocast-based file transfer without deviating therefrom. For example, one skilled in the art will recognize that geocast-based file transfer as described in the present application may apply to any environment, whether wired or wireless, and may be applied to any number of such devices connected via a communications network and interacting across the network. Therefore, geocast-based file transfer should not be limited to any single embodiment, but rather should be construed in breadth and scope in accordance with the appended claims.

What is claimed:

1. A system comprising:
a first apparatus; and
a second apparatus communicatively connected with the first apparatus, the second apparatus comprising:
a processor; and
memory coupled to the processor, the memory comprising executable instructions that when executed by the processor cause the processor to effectuate operations comprising:
geocasting a plurality of geocast messages to a plurality of devices of a mobile ad hoc network, the plurality of devices comprising the first apparatus, wherein the geocast messages are associated with a plurality of chunks of an entire file;
responsive to the plurality of chunks of the entire file being sent, sending a notification to the plurality of devices that instructs the plurality of devices to commence sending requests to the second apparatus for chunks that were not received, wherein the first apparatus does not send a request for chunks that were not received based on analysis of requests of other devices of the plurality of devices;
waiting a predetermined amount of time;
if a request for a chunk of the plurality of chunks of the entire file is received prior to expiration of the predetermined amount of time:
incorporating the requested chunk into a new geocast message; and
geocasting the new geocast message; and
responsive to receiving an indication that any of the plurality of devices received the plurality of the chunks of the entire file, terminating the process of sending the chunks that were not received to remaining devices of the plurality of devices.

2. The system of claim 1, the operations further comprising incorporating into at least one geocast message of the plurality of geocast messages an indication of a total number of chunks in the plurality of chunks, wherein the indication of the total number of chunks comprises information from which the total number of chunks may be inferred.

3. The system of claim 1, the operations further comprising incorporating an indication of the total number of chunks into each remaining geocast packet of the plurality of geocast packets.

4. The system of claim 1, the operations further comprising:
generating a name for the file; and
incorporating into a first geocast message of the plurality of geocast messages, an indication of a name of the file.

5. The system of claim 1, the operations further comprising incorporating an indication of a name of the file into each remaining geocast packet of the plurality of geocast packets.

6. The system of claim 1, wherein the first geocast message is geocast to a geographic region of an intended recipient.

7. The system of claim 1, wherein:
the geocast message includes a packet type, and
the geocast message is geocasted when the second apparatus is located in a long range forwarding zone defined for the packet type.

8. A method comprising:
geocasting, by a sending node, a plurality of geocast messages to a plurality of devices of a mobile ad hoc network, the plurality of devices comprising a first node, wherein the geocast messages are associated with a plurality of chunks of an entire file;
responsive to the plurality of chunks of the entire file being sent, sending a notification to the plurality of devices that instructs the plurality of devices to commence sending requests to the sending node for chunks that were not received;
waiting a predetermined amount of time;
if a request for a chunk of the plurality of chunks of the entire file is received prior to expiration of the predetermined amount of time:
incorporating the requested chunk into a new geocast message; and
geocasting the new geocast message; and
responsive to receiving an indication that any of the plurality of devices received the plurality of the chunks of the entire file, terminating a process of sending the chunks that were not received to remaining devices of the plurality of devices.

9. The method of claim 8, further comprising incorporating into at least one geocast message of the plurality of geocast messages an indication of a total number of chunks in the plurality of chunks, wherein the indication of the total number of chunks comprises information from which the total number of chunks may be inferred.

10. The method of claim 8, further comprising incorporating an indication of a total number of chunks into each remaining geocast packet of the plurality of geocast packets.

11. The method of claim 8, further comprising:
generating a name for the file; and
incorporating into a first geocast message of the plurality of geocast messages, an indication of a name of the file.

12. The method of claim 8, further comprising incorporating an indication of a name of the file into each remaining geocast packet of the plurality of geocast packets.

13. The method of claim 8, wherein the new geocast message is geocast to a geographic region of an intended recipient.

14. The method of claim 8, wherein:
the geocast message includes a type of packet, and
the geocast message is geocasted when the sending node is located in a long range forwarding zone defined for the packet type.

15. A non-transitory computer readable storage medium comprising executable instructions that when executed by a processor cause the processor to effectuate operations comprising:
geocasting, by a sending node, a plurality of geocast messages to a plurality of devices of a mobile ad hoc network, the plurality of devices comprising a first node, wherein the geocast messages are associated with a plurality of chunks of an entire file;
responsive to the plurality of chunks of the entire file being sent, sending a notification to the plurality of devices that instructs the plurality of devices to commence sending requests to the sending node for chunks that were not received;
waiting a predetermined amount of time;
if a request for a chunk of the plurality of chunks of the entire file is received prior to expiration of the predetermined amount of time:
incorporating the requested chunk into a new geocast message;
geocasting the new geocast message; and
responsive to receiving an indication that any of the plurality of devices received the plurality of the chunks of the entire file, terminating a process of sending the chunks that were not received to remaining devices of the plurality of devices.

16. The non-transitory computer readable storage medium of claim 15, further comprising incorporating an indication of a name of the file into each remaining geocast packet of the plurality of geocast packets.

17. The non-transitory computer readable storage medium of claim 15, wherein at least one geocast message of the at least one geocast message comprises a name of the file.

18. The non-transitory computer readable storage medium of claim 15, wherein the geocast message is geocast to a geographic region of an intended recipient.

* * * * *